(12) United States Patent
Kim

(10) Patent No.: US 11,544,590 B2
(45) Date of Patent: Jan. 3, 2023

(54) ANSWERING QUESTIONS DURING VIDEO PLAYBACK

(71) Applicant: Adobe Inc., San Jose, CA (US)

(72) Inventor: Seokhwan Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 793 days.

(21) Appl. No.: 16/510,491

(22) Filed: Jul. 12, 2019

(65) Prior Publication Data

US 2021/0012222 A1  Jan. 14, 2021

(51) Int. Cl.
- *G06N 5/04* (2006.01)
- *G06N 3/04* (2006.01)
- *G06F 16/783* (2019.01)
- *G06V 10/75* (2022.01)

(52) U.S. Cl.
CPC .......... *G06N 5/04* (2013.01); *G06F 16/7834* (2019.01); *G06N 3/04* (2013.01); *G06V 10/757* (2022.01)

(58) Field of Classification Search
CPC .......... G06N 5/04; G06N 3/04; G06N 3/0445; G06N 3/0454; G06F 16/7834; G06F 40/289; G06F 40/30; G06V 10/757; G06V 10/768; G06V 20/46; G06V 20/49; G10L 15/26; G06K 9/629
See application file for complete search history.

(56) References Cited

PUBLICATIONS

H. Alamri et al., "Audio Visual Scene-Aware Dialog," 2019 IEEE/CVF Conference on Computer Vision and Pattern Recognition (CVPR), 2019, pp. 7550-7559, doi: 10.1109/CVPR.2019.00774. (Year: 2019).*

Alayrac,"Unsupervised Learning from Narrated Instruction Videos", In Proceedings of the IEEE Conference on Computer Vision and Pattern Recognition (CVPR), Jun. 2016, 9 pages.

Bojanowski,"EnrichingWord Vectors with Subword Information", Jun. 2017, pp. 135-146.

Cho,"Learning Phrase Representations using RNN Encoder-Decoder for Statistical Machine Translation", In EMNLP, 2014., Sep. 3, 2014, 15 pages.

Huang,"Finding "It": Weakly-Supervised Reference-Aware Visual Grounding in Instructional Videos", Jun. 2018, 10 pages.

Huang,"Unsupervised Visual-Linguistic Reference Resolution in Instructional Videos", May 20, 2017, 10 pages.

Jang,"TGIF-QA: Toward Spatio-Temporal Reasoning in Visual Question Answering", Dec. 3, 2017, 9 pages.

Kim,"Convolutional Neural Networks for Sentence Classification", Oct. 2014, pp. 1746-1751.

Kim,"DeepStory: Video Story QA by Deep Embedded Memory Networks", Jul. 2017, 7 pages.

Kingma,"Adam: A Method for Stochastic Optimiziation", Dec. 22, 2014, 9 pages.

(Continued)

*Primary Examiner* — Matthew Mikels

(74) *Attorney, Agent, or Firm* — FIG. 1 Patents

(57) ABSTRACT

In implementations of answering questions during video playback, a video system can receive a question related to a video at a timepoint of the video during playback of the video, and determine audio sentences of the video that occur within a segment of the video that includes the timepoint. The video system can generate a classification vector from words of the question and the audio sentences, and determine an answer to the question utilizing the classification vector. The video system can obtain answer candidates, and the answer to the question can be selected as one of the answer candidates based on matching the classification vector to one of the answer vectors.

20 Claims, 7 Drawing Sheets

(56) References Cited

PUBLICATIONS

Lei, "TVQA: Localized, Compositional Video Question Answering", Sep. 5, 2018, 13 pages.
Malmaud, "What's Cookin'? Interpreting Cooking Videos using Text, Speech and Vision", Jun. 2015, pp. 143-152.
Perozzi, "DeepWalk: Online Learning of Social Representations", Jun. 27, 2014, 10 pages.
Povey, "The Kaldi Speech Recognition Toolkit", Jan. 2011, 4 pages.
Sener, "Unsupervised Semantic Parsing of Video Collections", Dec. 2015, 9 pages.
Tapaswi, "MovieQA: Understanding Stories in Movies through Question-Answering", Sep. 21, 2016, 10 pages.
Wang, "How to Make a BLT Sandwich? Learning to Reason towards Understanding Web Instructional Videos", Dec. 6, 2018, 10 pages.
Ye, "Video Question Answering via Attribute-Augmented Attention Network Learning", Jul. 20, 2017, 4 pages.
Yu, "Instructional Videos for Unsupervised Harvesting and Learning of Action Examples", Nov. 2014, 4 pages.
Zhou, "End-to-End Dense Video Captioning with Masked Transformer", Apr. 3, 2018, 13 pages.

* cited by examiner

400

```
┌─────────────────────────────────────────────────────┐
│ Receive, at a timepoint of the video during the     │
│ playback of the video, a question related to the    │
│ video                                               │
│                     402                             │
└─────────────────────────────────────────────────────┘
                          │
                          ▼
┌─────────────────────────────────────────────────────┐
│ Determine a segment of the video that includes the  │
│ timepoint of the video                              │
│                     404                             │
└─────────────────────────────────────────────────────┘
                          │
                          ▼
┌─────────────────────────────────────────────────────┐
│ Determine audio sentences of the video that occur   │
│ within the segment of the video                     │
│                     406                             │
└─────────────────────────────────────────────────────┘
                          │
                          ▼
┌─────────────────────────────────────────────────────┐
│ Generate a classification vector from words of the  │
│ question and words of the audio sentences of the    │
│ video                                               │
│                     408                             │
└─────────────────────────────────────────────────────┘
                          │
                          ▼
┌─────────────────────────────────────────────────────┐
│ Determine an answer to the question utilizing the   │
│ classification vector                               │
│                     410                             │
└─────────────────────────────────────────────────────┘
```

Determine audio sentences of the video, the audio sentences occurring within a time segment during the playback of the video that includes a timepoint of the video at which a question is received
602

Generate a classification vector based on concatenating a question feature vector determined from words of the question and a context feature vector determined from words of the audio sentences of the video
604

Determine an answer to the question based on matching the classification vector to one of a plurality of answer vectors
606

FIG. 6

ANSWERING QUESTIONS DURING VIDEO PLAYBACK

BACKGROUND

The convergence of digital cameras, the Internet, and social media is changing the way people share knowledge. Instead of relying on traditional books and manuals that include text and still images (e.g., photographs and drawings), users now often view online videos for instructional information. For instance, a mechanic may visit a website that includes a video system to provide instructional videos illustrating various aspects of automobile repair, such as how to assemble a valve-train on a car, how to tune an engine's fuel injection system by adjusting computer settings of a car, etc.

Most video systems do not have a mechanism to answer user questions during video playback. Some video systems, however, may accept user inputs that include a question about a video (e.g., a natural language question) during video playback. To provide an answer to the question, the video systems usually process the natural language question by itself, such as by performing parts-of-speech analysis. However, for many questions, the natural language question itself does not contain sufficient information to appropriately answer the question. For instance, suppose a mechanic is watching an instructional video that illustrates how to assemble cylinders and heads on an engine, and asks "What's the proper torque?" The appropriate answer to this question cannot be determined from the question itself, because the answer is likely different during different steps of the engine assembly. For example, an answer of 65 ft-lbs may be appropriate for a first part of the engine assembly, but inappropriate for a subsequent part of the engine assembly.

Accordingly, conventional video systems that provide videos to users and answers to user questions during video playback can be frustrating for a user to operate and limited in their usefulness, since these video systems may not be able to provide an answer to the user. Worse, these video systems may provide an incorrect answer to a user by generating the answer based merely on the natural language question by itself.

SUMMARY

Techniques and systems are described for answering questions during video playback. A video system determines context of a video during a time at which a question is asked, such as by determining audio sentences of the video within a time segment that includes the time when the question is asked. The video system includes a question encoder to generate a question representation from the question, and context encoders to generate a context representation from the audio sentences of the video. The video system concatenates the question representation with the context representation to generate a classification vector, which can be used to generate an answer to the question. In one example, the video system matches the classification vector to answer vectors by computing dot products between the classification vector and the answer vectors, and selects an answer based on the dot products.

The video system can generate the answer vectors with an answer encoder that encodes answer candidates drawn from an answer pool. The answer pool includes answers for a plurality of questions, not just a current question received by a user. In implementations, the answers may be generated by users (e.g., knowledgeable persons, such as professional artists) whose knowledge is incorporated into a domain knowledge base by linking the answers to entities of the domain knowledge base. The video system can configure the answer encoder that encodes the answer candidates based on a graph structure of the domain knowledge base, thus transferring the domain knowledge to the answer vectors. Moreover, the video system is not limited to those videos used to generate answer candidates, but can be used for any video for a given domain (e.g., subject or topic) based on questions and answer candidates generated for other videos pertaining to the domain.

Accordingly, the video system can generate an answer to a question based on context of the video when the question is asked, and the answer is accurate and reliable since it is grounded to the domain knowledge base. Hence, the video system is not limited to answering questions having an answer that may be determined from the question itself, but can also answer questions with an answer based on the context of the video or domain knowledge about the video for any video pertaining to a domain.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 illustrates a flow diagram depicting an example procedure in accordance with one or more aspects of the disclosure.

FIG. 6 illustrates a flow diagram depicting an example procedure in accordance with one or more aspects of the disclosure.

DETAILED DESCRIPTION

Overview

Technology is changing the way people obtain information. Instead of relying on traditional methods of gaining knowledge, such as books and manuals that include text and still images, users now often view online videos for instructions. Though most video systems do not accept user questions during video playback, some of the video systems may accept user inputs, such as a question about the video in the form of a natural language question. To provide an answer to the question, the video systems often process the natural language question by itself, such as by performing parts-of-speech analysis. However, for many questions, the natural language question itself does not contain sufficient information to appropriately answer the question.

Figure 1:
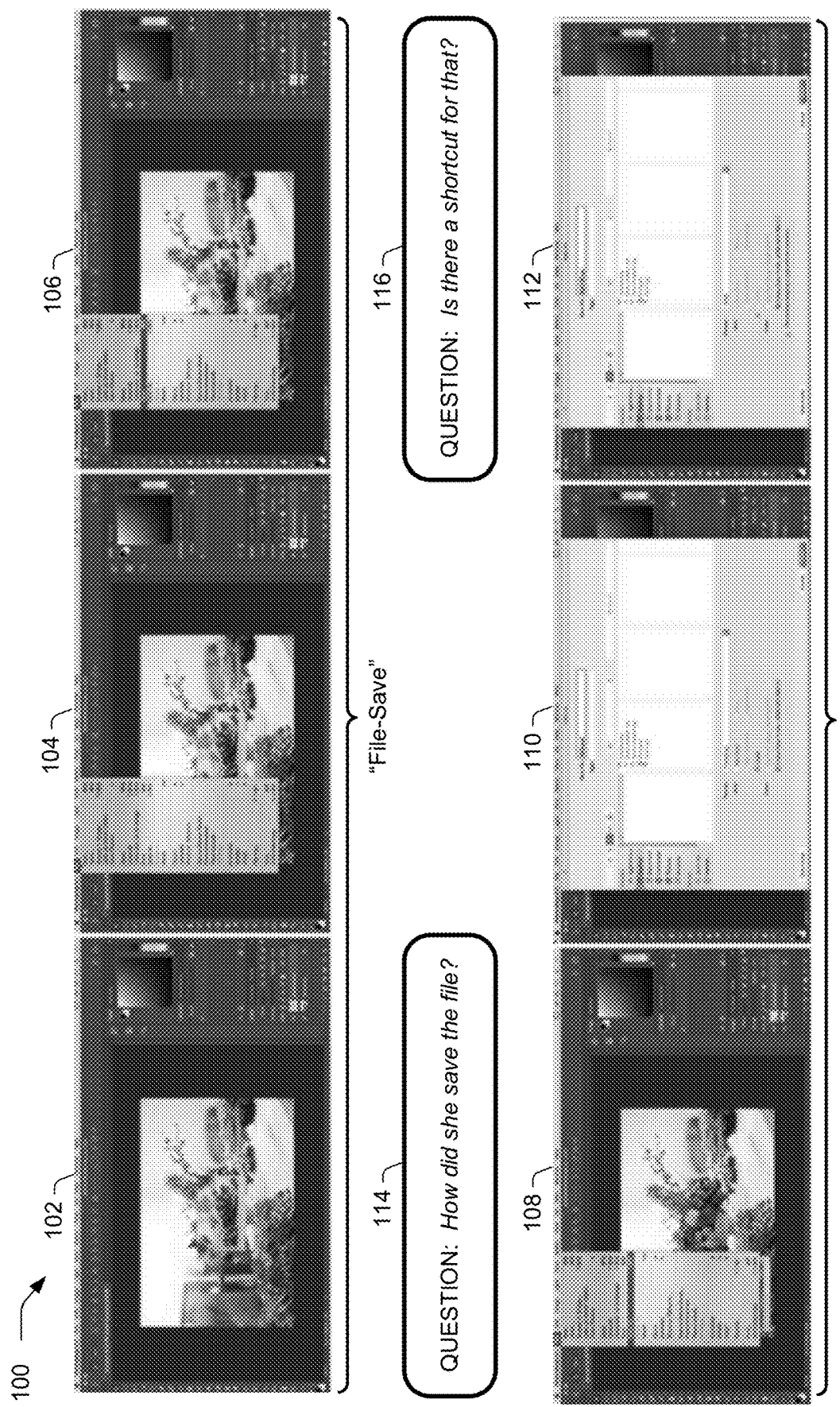
FIG. 1 illustrates example image frames of a video during video playback in accordance with one or more aspects of the disclosure.

For instance, FIG. 1 illustrates example image frames 100 of a video during video playback in accordance with one or more aspects of the disclosure. Image frames 100 are examples of frames of an instructional video that can be presented by a video system, such as an instructional video that teaches a user how to operate a software application (e.g., an image editing application). Image frames 100 include image frames 102-106, which represent a first portion of the video in which a "File-Save" operation is being presented, and image frames 108-112, which represent a second portion of the video in which a "File-Save As" operation is being presented. In this example, the presenter speaking in the video describes how to save a file using a "File-Save" operation as shown in image frames 102-106, and later in the video describe how to save a file using a "File-Save As" operation as shown in image frames 108-112.

During the video, the video system may receive a user question 114 asking "How did she save the file?" Question 114 is an example of a question in which the question itself does not contain sufficient information to appropriately answer the question. Rather, to answer the question 114, the video system takes into account the context of the video, such as the content of the video when the user asks the question 114. For instance, if the user asks question 114 while the presenter is describing a "File-Save" operation and discussing image frames 102-106, then the video system may determine that an appropriate answer to the question is "A File-Save operation". However, if the user asks question 114 while the presenter is describing a "File-Save As" operation and discussing image frames 108-112, then the video system may determine that an appropriate answer to the question is "A File-Save As operation".

Question 114 is one example of a question in which the question itself does not contain sufficient information to appropriately answer the question. The answer to the question 114 can be obtained by context of the video, such as audio of the video corresponding to when the question 114 is asked. In some cases, the context of the video may not include sufficient information to appropriately answer the question. For instance, question 116 is an example of a user question received by the video system during the video and asks "Is there a shortcut for that?" In the absence of any discussion by the presenter about shortcuts for software actions, question 116 is an example of a question in which the question itself and the context of the video do not contain sufficient information to appropriately answer the question. Rather, to answer the question 116, the video system may require external domain knowledge, such as knowledge about the image editing application from an expert user of the image editing application.

Hence, conventional video systems that provide videos to users and answers to user questions during a video by merely processing the question by itself without considering context of the video or domain knowledge of the video are limited in their usefulness. These conventional video systems may simply not be able to provide an answer to a question, or worse, may provide an incorrect answer to a user.

Accordingly, this disclosure describes systems, devices, and techniques for answering questions during video playback based on context of the video and domain knowledge. A video system may receive a user question during playback of a video, such as a natural language question that is spoken or typed, and determine context of the video during a time at which the question is received. The video system may determine context of the video in any suitable way, such as objects in frames of the video for a time segment of the video that includes a timepoint at which a user question is received, audio sentences of the video that occur within the time segment of the video, text related to image frames of a user workspace of an image editing application, editing commands performed by a user in the user workspace, combinations thereof, and the like. In one example, the video system obtains audio content of the video from t−w to t+w for a time window w and time t at which the question is asked. Sentences of the audio content over this time interval represent context of the video related to the question.

The video system can determine an answer to the question based on the audio sentences of the video and the question. For instance, the video system may include a question encoder that receives the question (e.g., text of the question in any suitable format, such as concatenated word vectors), and generates a question representation, such as a question feature vector based on the words of the question. In one example, the question encoder has a sentence encoder implemented as a convolutional neural network that generates a feature map from the question, and generates the question representation (e.g., the question feature vector) from the feature map with a max pooling operation.

The video system may also generate a context representation from the context of the video corresponding to the time segment of the video that includes a timepoint at which the video system receives a user question about the video. In one example, the video system provides each of the audio sentences of the video within the time segment of the video to multiple instantiations of the sentence encoder used to generate the question representation discussed above. The video system can generate a context representation from the outputs of the sentence encoders that represents the context of the video during the question. The video system can jointly process the outputs of the sentence encoders with a bidirectional recurrent layer to learn temporal dynamics of the context, and generate a context representation as a context feature vector from the output of the bidirectional recurrent layer at the timepoint of the video corresponding to the question. The video system may then fuse the question representation and the context representation by concatenating the question feature vector and the context feature vector to form a classification vector.

The video system may determine an answer to the question utilizing the classification vector. For instance, the video system may determine an answer to the question by solving a ranking problem that returns a highest-ranking answer determined from the classification vector. In one example, the video system provides the classification vector to a neural network with fully-connected layers and a softmax operation at the final layer to determine the answer to the question. Additionally or alternatively, the video system may match the classification vector to answer vectors by computing matching scores, (e.g., dot products) between the classification vector and the answer vectors. The video system may select an answer to the question based on the matching scores, such as an answer candidate corresponding to a largest dot product.

The video system can generate the answer vectors with an answer encoder that encodes the answer candidates drawn from an answer pool. The answer candidates in the answer pool represent possible answers to a plurality of possible questions, rather than being limited to answer candidates specific to a current question that is asked. Further, the answer candidates in the answer pool can be generated by knowledgeable users (e.g., professional artists who use Photoshop®), rather than crowdsourcing from the general public.

The video system may maintain a domain knowledge base that includes entities representing objects (e.g., instructional resources) that can be displayed in a video. For instance, a domain knowledge base may include descriptions of dialogue boxes that can be displayed as part of an instructional video, and options for each of the dialogue boxes. By linking the answer candidates in the answer pool that are generated by the knowledgeable users to the entities of the domain knowledge base, the video system can incorporate the domain knowledge of the knowledgeable users into the domain knowledge base and transfer this domain knowledge to the answer of a question. In one example, the video system generates a graph structure of the domain knowledge base and configures the answer encoder that generates answer vectors from the answer candidates based on the graph structure, such as by adjusting weights of the answer encoder based on an embedding of the graph structure. Thus, the answer vectors generated by the answer encoder are based on the external domain knowledge of the knowledgeable users.

The video system may be trained using answer candidates generated by the knowledgeable users. For instance, weights of one or more of a question encoder, context encoder, answer encoder, or matching function may be adjusted based on triplets including a question, an answer, and context of the video. The questions and answers may be generated by the knowledgeable users, such as at predetermined times of the video, periodically throughout the video, at times designated by the knowledgeable users, combinations thereof, and the like. The context of the video may include audio sentences of the video within a time segment that includes a timepoint of the video corresponding to when a question is asked, one or more objects in video frames that are displayed during the time segment, text related to the video that is not included in an audio track of the video, such as text displayed as part of a scene in an image frame (e.g., text on a billboard displayed in a video), combinations thereof, and the like. In one example, context of the video includes text related to image frames of a user workspace of an image editing application, such as editing commands performed by a user in the user workspace and data related to the editing commands, including questions and answers regarding an editing command, a help file (e.g., instructions for use) of an editing command, similar editing commands used by other users, etc. To train the video system, the questions, contexts, and answer pool may be provided as inputs to the video system, with ground truth being represented by the answer to the question generated by a knowledgeable user. Weights of the video system may be adjusted to minimize a loss function, such as a negative log likelihood loss function.

Moreover, because the video system does not rely on annotations specific to a type of video, the video system, once trained for a domain (e.g., subject or topic), can be used for any video on that domain. For instance, once the video system has been trained for instructional videos on how to use Adobe's Photoshop®, the video system can be used for official instructional videos available from Adobe as well as online instructional videos available on a video-sharing website that are created by users of Photoshop®, even if the online instructional videos were not used to determine answers by the knowledgeable users (e.g., professional artists who use Photoshop®).

Accordingly, the video system can generate an answer to a question during video playback based on context of the video and domain knowledge of the video. Hence, the video system is not limited to answering questions with an answer that may be determined from the question itself, and is capable of answering questions with appropriate answers when conventional systems fail to provide an answer or provide an incorrect answer.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
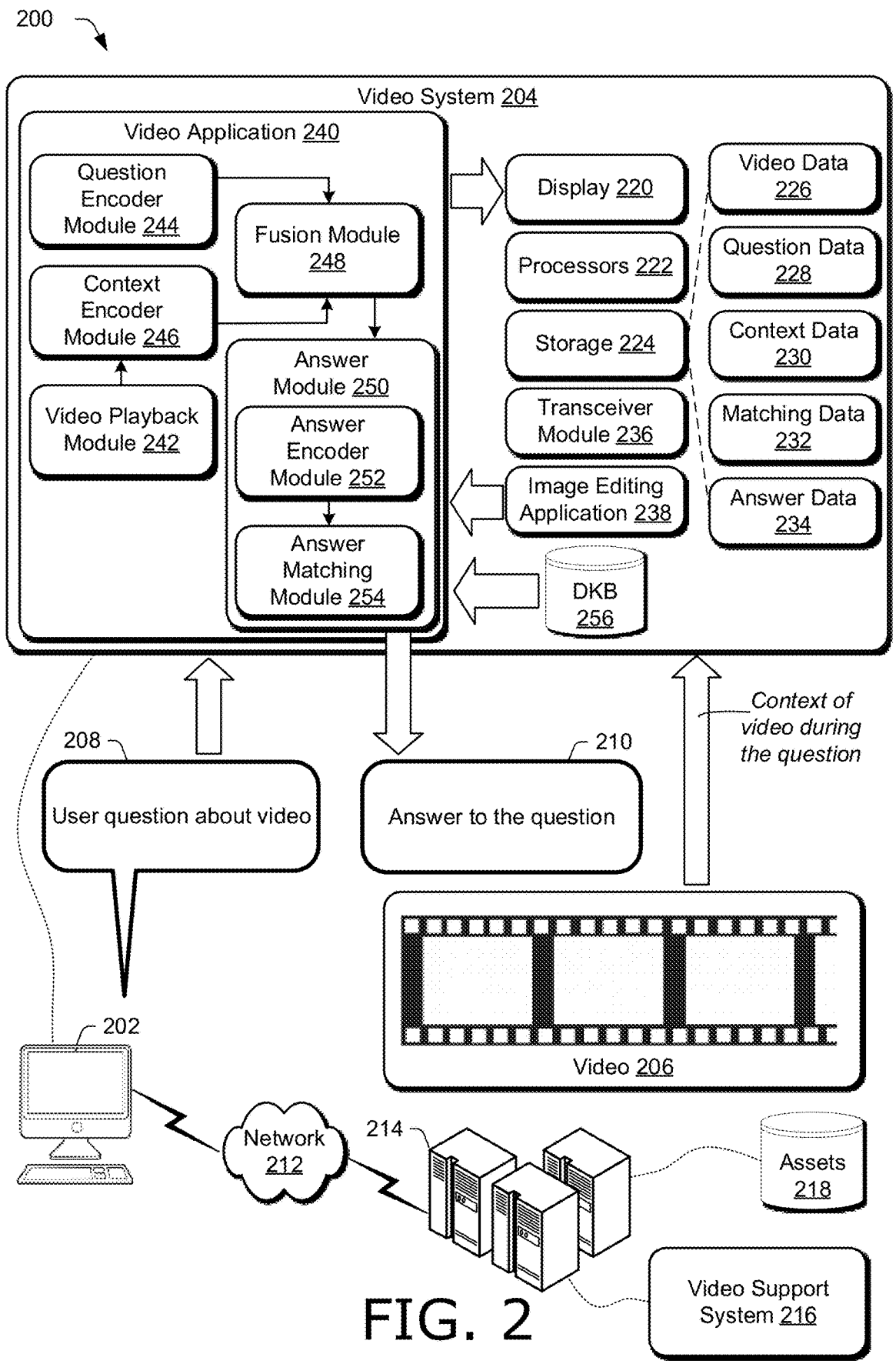
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes computing device 202 depicted as a desktop computer. A desktop computer is one example of computing device 202, which can generally include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing device 202 may range from full resource devices with substantial memory and processor resources (e.g., personal computers, game consoles) to a low-resource device with limited memory or processing resources (e.g., mobile devices).

Notably, computing device 202 can include any suitable number of computing devices, such as one or more computing devices, (e.g., a smart phone connected to a tablet). Furthermore, discussion of one computing device of computing device 202 is not limited to that one computing device, but generally applies to each of the computing devices included in computing device 202. Furthermore, computing device 202 may be representative of one or a plurality of different devices connected to a network that perform operations "over the cloud" as further described in relation to FIG. 7. In one example, computing device 202 includes multiple computing devices communicatively coupled to each other, such as with a low power wireless communication standard (e.g., a Bluetooth® protocol). Hence, an asset (e.g., digital image, video, text, drawing, artwork, document, file, and the like) generated, processed, edited, or stored on one device of computing device 202

(e.g., a desktop computer) can be communicated to, and displayed on and processed by another device of computing device 202 (e.g., a tablet).

Various types of input devices and input instrumentalities can be used to provide input to computing device 202. For example, computing device 202 can recognize input as being a mouse input, drawing-tool input, stylus input, touch input, input provided through a natural user interface, and the like. Thus, computing device 202 can recognize multiple types of gestures including touch gestures and gestures provided through a natural user interface. In one example, computing device 202 includes speech recognition, identification, and synthesis functionalities, microphones, and speakers that allow computing device 202 to communicate with a user in a conversation, e.g., a user conversation.

Computing device 202 includes video system 204 to play videos, including answering questions during video playback. In the example in FIG. 2, video system 204 provides video 206 to computing device 202, which can display the video 206 to a user. During playback of the video 206, the video system 204 receives a user question 208 about the video 206. For instance, a user may speak or type the user question 208 into a user interface exposed on the computing device 202. An example of a user question 208 may be "How do you open this item?", regarding an item of the video 206.

Responsive to receiving the user question 208, the video system 204 determines context of the video during the question. For instance, the video system 204 may determine audio sentences of the video 206 (e.g., sentences of an audio track of the video 206) within a time segment of the video 206 that includes a timepoint at which the question 208 is received, an object or text in a video frame displayed during the time segment, combinations thereof, and the like. The video system determines an answer 210 to the question 208 based on the context of the video, and outputs the answer 210 on computing device 202, such as by exposing the answer 210 on a display screen of the computing device 202 (e.g., overlaying the answer 210 on top of the video 206), broadcasting the answer as audible speech via a speaker of the computing device 202, etc. Hence, the video system 204 can determine an answer 210 to a question 208 during video playback based on context of the video 206.

Computing device 202 is also coupled to network 212, which communicatively couples computing device 202 with server 214. Network 212 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 214 may include one or more servers or service providers that provide services, resources, assets, or combinations thereof to computing device 202. Services, resources, or assets may be made available from server 214 to video system 204, video support system 216, or combinations thereof, and stored at assets 218 of server 214. For instance, videos stored at assets 218 may be made available to computing device 202. Hence, video 206 can include any suitable video asset stored at assets 218 of server 214.

Server 214 includes video support system 216 configurable to receive signals from computing device 202, process the received signals, and send the processed signals to computing device 202 to support answering questions during video playback. For instance, computing device 202 may obtain any suitable representation of a user question (e.g., question 208) and communicate it along with any suitable data to server 214, such as a timestamp of the video 206 at which the user question is asked. Server 214, using video support system 216, may determine a ranked list of answers from the data received from computing device 202. Server 214 may then send the ranked list of answers and scores for the answers in the list to computing device 202, which can provide an answer to the question from the ranked list of answers from server 214, such as by selecting a highest ranking answer from the list. Accordingly, video support system 216 of server 214 can include a copy of video system 204.

Computing device 202 includes video system 204 for answering questions during video playback. Video system 204 includes a display 220, which can expose any suitable data used by or associated with video system 204. In one example, display 220 displays a user interface for exposing videos, such as the video 206. Display 220 can expose a user interface configurable to receive a user question during playback of a video, and display an answer generated by the video system 204 to the question. Display 220 can include any suitable type of display, such as a touchscreen, liquid crystal display, plasma display, head-mounted display, projector and screen, and the like. In one example, display 220 displays a user interface that exposes a user workspace of an image editing application.

Video system 204 also includes processors 222. Processors 222 can include any suitable type of processor, such as a graphics processing unit, central processing unit, digital signal processor, processor core, combinations thereof, and the like. Hence, video system 204 may be implemented at least partially by executing instructions stored in storage 224 on processors 222. For instance, processors 222 may execute portions of video application 240 (discussed below in more detail).

Video system 204 also includes storage 224, which can be any suitable type of storage accessible by or contained in video system 204. Storage 224 stores data and provides access to and from memory included in storage 224 for any suitable type of data. For instance, storage 224 includes video data 226 including data related to videos, such as video content, audio content, and a timeline of a video (e.g., a sequence of timestamps, chapter numbers, scene numbers, etc.). Video data 226 may also include metadata of a video, such as a domain or subject of a video, a type of video (e.g., instructional, tutorial, entertainment, professional, amateur, etc.), an indicator of how many questions have been asked for a video, an indicator of how many questions have been answered for a video, and the like.

Storage 224 also includes question data 228 including data related to a question received by video system 204, such as an audio recording of the question, a transcription of the question (e.g., text), and a timepoint of a video (e.g., timestamp or time index) at which the question is received. Question data 228 may also include a question representation of a question, such as a feature map, feature matrix, feature vector, word embedding, or combinations thereof, determined from the words of the question 208. In one example, question data 228 includes a representation of a sentence encoder, such as convolution weights and architecture configurations of a convolutional neural network that generates a question representation based on the words of a question, such as a question feature vector.

Storage 224 also includes context data 230 including data related to context of a video, such as audio of a video, audio sentences of a video (e.g., recordings of the sentences of the audio or textual transcriptions of the audio), indicators of objects in video frames of a video, text of a video, etc., and context representations generated from the context of the video, such as one or more context feature vectors. Context data 230 may include an indicator of time of a video corresponding to context of the video, such as a time index (e.g., timestamp) of the video corresponding to a timepoint of the video when a question is received and a window of time surrounding the time point (e.g., a time segment). In one example, context data 230 includes a representation of a sentence encoder, such as convolution weights and architecture configurations of a convolutional neural network that generates a context representation (e.g., context feature vector). Additionally or alternatively, context data 230 may include a representation (e.g., weights and architecture configurations) of a bidirectional recurrent layer used to generate a context representation from the multiple context representations, such as a plurality of context feature vectors that correspond to different audio sentences of the video. Context data 230 may also include an indicator of a method of combining the outputs of sentence encoders to generate a context representation, such as setting an indicator to a first value to indicate selection of one of the outputs, setting the indicator to a second value to indicate concatenation of multiple outputs of the sentence encoders, and setting the indicator to a third value to indicate joint processing of the outputs (e.g., with a bidirectional recurrent layer).

Storage 224 also includes matching data 232 including data related to selecting an answer to a question, such as a classification vector generated by fusing a context representation and a question representation, and an answer determined based on the classification vector. Matching data 232 may include a representation (e.g., weights and architecture configurations) of a neural network with fully-connected layers and a softmax operation at the final layer to determine an answer from the classification vector. Matching data 232 may include matching scores between the classification vector and answer vectors generated from answer candidates. For instance, matching scores may include dot products, and answer candidates may be ranked according to the dot products. Matching data 232 may also include threshold values, such as a matching threshold that represents a minimum matching score that an answer candidate must have for it to be selected as an answer to a question.

Storage 224 also includes answer data 234 including data related to answer candidates of video system 204, such as an answer pool of answer candidates and a domain knowledge base that incorporates external domain knowledge of professional designers by linking the answer candidates to entities representing instructional resources that can be displayed in a video. Answer data 234 may include answer vectors generated from answer candidates in an answer pool, and a representation (e.g., weights and architecture configurations) of a neural network used to generate the answer vectors. Answer data 234 may also include a graph structure of a domain knowledge base that can be used to configure an answer encoder to generate answer vectors.

Furthermore, video system 204 includes transceiver module 236 that can be implemented as any type of module or component in software (e.g., as software instructions that are executable with a processing system), hardware, or combinations thereof, as a standalone application or as a module or component of another device application, and in any type of computing device. The transceiver module 236 can be implemented to transmit and receive data using any suitable type and number of communication protocols. For instance, data within video system 204 may be transmitted to server 214 with transceiver module 236. Furthermore, data can be received from server 214 with transceiver module 236. Transceiver module 236 can also transmit and receive data between computing devices of computing device 202. In one example, transceiver module 236 includes a low power wireless communication standard (e.g., a Bluetooth® protocol) for communicating data between computing devices of computing device 202.

Video system 204 also includes image editing application 238 that can be implemented to edit images, such as digital photographs, videos (e.g., sequences of image frames making up a video), animation sequences, and the like. Adobe's Photoshop® is an example of an image editing application that may be included in image editing application 238. Accordingly, image editing application 238 can include a user workspace for editing images and video sequences, such as part of a user interface exposed in a display 220. Image editing application 238 may provide image frames of a user workspace of image editing application 238 as part of a video to video system 204. Hence, video system 204 may answer questions during playback of a video that includes image frames of a user workspace of image editing application 238.

The video system 204 may determine context of a video that includes image frames of a user workspace of image editing application 238 in any suitable way. In one example, the video system 204 obtains editing commands performed by a user in the user workspace and data related to the editing commands, such as a list of questions and answers regarding an editing command, a help file (e.g., instructions for use) of an editing command, similar editing commands used by other users, combinations thereof, and the like. Additionally or alternatively, the video system 204 may determine objects in the workspace to determine context of the workspace, such as a type of automobile, number and age of persons, weather, etc. Hence, video system 204 and image editing application 238 may work in conjunction with each other to allow a user to operate the image editing application 238 and edit images of a user workspace, while asking questions during the editing process and receiving answers to the questions.

Video system 204 also includes video application 240. Video application 240 includes video playback module 242, question encoder module 244, context encoder module 246, fusion module 248, and answer module 250, which includes answer encoder module 252 and answer matching module 254. These modules work in conjunction with each other to facilitate answering questions during video playback. These modules can be implemented as any type of module or component in software (e.g., as software instructions that are executable with a processing system), hardware, or combinations thereof, as a standalone application or as a module or component of another device application, and in any type of computing device.

Video playback module 242 can be implemented for video playback of a video on a computing device, such as computing device 202. For instance, video playback module 242 may playback a video on display 220, such as in a user interface exposed on display 220. Video playback module 242 can playback any suitable type of video, including instructional videos, tutorial videos, entertainment videos, videos created by professional artists, videos created by amateur designers, combinations thereof, and the like. Furthermore, a video played by video playback module 242 can be any suitable format, such as an analog encoded video (e.g., according to an NTSC or PAL standard), or digitally encoded (e.g., according to an ATSC standard or compliant with an MPEG or AVI protocol). Accordingly, video playback module 242 includes or has access to any suitable type of video player, such as a software-implemented media player, a web browser with a media player, a DVD player, a hard-disk player, etc.

In one example, video playback module 242 is configured for video playback of an online video, such as a video obtained from a server (e.g., server 214) that hosts a website from which videos can be downloaded. Additionally or alternatively, video playback module 242 may be configured for video playback of a video stored on a client computing device (e.g., computing device 202), such as a tutorial video for an image editing application installed on the computing device and included in the software of the image editing application. In one example, video playback module 242 is configured for video playback of a video that includes image frames made up of a user workspace of an image editing application.

Video playback module 242 may expose any suitable control options along with a video when the video is played. For instance, the video playback module 242 may expose options that control the playback of the video that is exposed, such as pause, fast-forward, rewind, stop, and play. The video playback module 242 may expose options to control video content of the video, such as options to select an aspect ratio, options to select a resolution (e.g., number of pixels), and adjusters for color, contrast, brightness, sharpness, etc. The video playback module 242 may also expose options to control audio content of the video, such as to select a language of the audio, to enable captions, volume, etc. The video playback module 242 may receive any suitable type of user input to adjust the control options, such as text, gestures (e.g., user movements, touch selections on a touchscreen), voice commands, mouse clicks, keyboard shortcuts, combinations thereof, and the like.

A video played by video playback module 242, along with any suitable information, such as video content, audio content, a transcription of the audio content of the video, a video player used to play a video, a file format of a video, a resolution, a language of a video, combinations thereof, and the like, used by or calculated by video playback module 242 are stored in video data 226 of storage 224 and made available to modules of video application 240. In one example, video playback module 242 plays a video on a computing device and provides content of the video (e.g., video content and audio content) to context encoder module 246.

Question encoder module 244 can be implemented to receive a user question and generate a question representation from the user question. Question encoder module 244 can receive a user question, such as a question related to a video, in any suitable way. In one example, question encoder module 244 receives a spoken utterance that includes a user question (e.g., user speech), and converts the audio of the spoken utterance to text of the user question, such as with a speech-to-text converter that receives an audible input (e.g., a spoken utterance) and transcribes the spoken input into words (e.g., text including a written question). For instance, the speech-to-text converter can convert audio from a microphone or a file that includes data representing the audio to a text file that includes a transcription (e.g., text) of the audio. Additionally or alternatively, question encoder module 244 may receive a user question in a text format, such as via user input on a keyboard of computing device 202. For instance, a user may type the text "Is there a shortcut for that?"

Question encoder module 244 generates a question representation from the user question. Question encoder module 244 can generate any suitable question representation based on the user question, such as a feature map, feature matrix, feature vector, word embedding, or combinations thereof. In one example, question encoder module 244 includes a sentence encoder that generates a question representation based on a user question, such as a sentence encoder as described in "Convolutional neural networks for sentence classification" in the *Proceedings of the 2014 Conference on Empirical Methods in Natural Language Processing*, pp. 1746-1751, by Yoon Kim.

A sentence encoder of question encoder module 244 may apply a convolutional neural network to a concatenation of the words of a user question, $x_1 \oplus x_2 \oplus \ldots \oplus x_N$, where $x_i$, $i=1 \ldots N$ denotes a word of the user question and $\oplus$ denotes a concatenation operator. The convolutional neural network may include convolutional layers that apply convolution filters to windows of words of the user question to generate a feature map, and the sentence encoder may extract features from the feature map using max pooling operations. In one example, the features extracted with the max pooling operations are used by question encoder module 244 to form a question feature vector from a user question.

A question representation generated by question encoder module 244, along with any suitable information, such as a question feature vector, an audio recording of a spoken utterance that includes a user question, a text transcription of a user question, a concatenation of words of a user question, weights of a sentence encoder used to generate a question representation, combinations thereof, and the like, used by or calculated by question encoder module 244 are stored in question data 228 of storage 224 and made available to modules of video application 240. In one example, question encoder module 244 provides a question representation based on a user question (e.g., a question feature vector) to fusion module 248.

Context encoder module 246 can be implemented to determine context of a video for a time segment of the video that corresponds to a user question, and generate a context representation based on the context. Context encoder module 246 can determine context of a video in any suitable way. In one example, context encoder module 246 determines a time segment that includes a timepoint during the video playback at which a question related to the video is received. For instance, context encoder module 246 may determine a time segment of a video from t−w to t+w for a time window w and timepoint t at which a user question is received by question encoder module 244. The time window w may be programmable, such as user-selectable. An example default value of the time window w may be three seconds, so that context encoder module 246 may obtain context of a video over a six second time segment centered about a time at which a user question is asked.

Context encoder module 246 may determine any suitable context of the video during the time segment, such as audio sentences of the video within the time segment, text related to the video that is not included in an audio track of the video, such as text displayed as part of a scene in an image frame (e.g., text on a sign displayed in a video), or combinations thereof. For instance, image frames corresponding to the time segment of a video determined by context encoder module 246 may include street signs of a city, and context encoder module 246 may determine the name of the city from the street signs and use the name of the city as context of the video, despite the city name being absent from the audio track of the video.

Additionally or alternatively, context encoder module 246 may determine as context of the video one or more objects in video frames that are displayed during the time segment. For instance, the context encoder module 246 may include an object classifier that is trained to detect objects in images, such as objects from classes, e.g., classes corresponding to dogs, persons, trees, automobiles, etc. The object classifier may receive a digital image as input and generate a list of objects included in the image, a location of the objects in the image (e.g., a bounding box of the image that includes an object), sub-classes of object, such as object types (e.g., breed of dog, manufacturer of automobile, gender of person, age range of person, etc.).

In one example, context encoder module 246 determines context of a video that includes image frames of a user workspace of an image editing application which does not include audio. Context encoder module 246 may determine context of the video from text related to the image frames of the user workspace. In one example, the context encoder module 246 obtains editing commands performed by a user in the user workspace and data related to the editing commands, such as questions and answers regarding an editing command, a help file (e.g., instructions for use) of an editing command, similar editing commands used by other users, combinations thereof, and the like. Context encoder module 246 may extract text from these editing commands and data into context of the video. Additionally or alternatively, context encoder module 246 may determine objects in the workspace to determine context of the workspace, such as a type of automobile, number and age of persons, weather, etc., and extract text related to these objects as context of the video. As an example, the context encoder module 246 may determine context of a video that includes image frames of a user workspace in which a user is applying a filter to a picture of a truck on a sunny day as "sepia filter for an automobile in sunny weather".

Context encoder module 246 may include or have access to a speech-to-text converter as described above that receives audio as input, such as audio sentences of the video during the time segment that includes the timepoint corresponding to a user question, and converts the audio into words (e.g., text including sentences of an audio track of the video). Additionally or alternatively, context encoder module 246 may obtain the audio sentences as text. For instance, context encoder module 246 may determine a time segment that includes the timepoint of the video at which a user question is asked, and retrieve the text of the audio track for the time segment from a transcription of the audio track that is included with the video, such as a transcription for a caption of the video in a closed captioning system.

Context encoder module 246 generates a context representation based on the context of the video during the time segment of the user question. Context encoder module 246 can generate a context representation in any suitable way. In one example, context encoder module 246 includes one or more instantiations of a sentence encoder as described above. For instance, context encoder module 246 may include sentence encoders that have the same architecture and convolutional weights as a sentence encoder of question encoder module 244. Context encoder module 246 may use one or more contexts of the video as described above as inputs to the sentence encoders, such as audio sentences of the video, outputs of the object classifier, text extracted from the video, text describing a user workspace, or combinations thereof. Context encoder module 246 may supply a respective context of the video (e.g., a respective audio sentence, text denoting a respective object class, text describing a respective user edit, etc.) to each of the sentence encoders to generate a plurality of context representations. In one example, context encoder module 246 generates one context representation for each audio sentence of the context of the video. Additionally or alternatively, context encoder module 246 can generate a respective context representation for each object of an image identified by an object classifier of context encoder module 246, such as by concatenating words describing the object (e.g., concatenating the class "automobile" with words denoting an automobile's year of manufacture, manufacturer, and type of automobile), and providing the concatenated words for the object to a sentence encoder. Accordingly, each context representation determined by context encoder module 246 may include features determined by processing a concatenation of words of the context (e.g., words of an audio sentence, words describing an object, etc.) with a neural network to generate a feature map, and extracting the features of the context representation with a max pooling operation. Context encoder module 246 may then determine a single context representation (e.g., a context feature vector) for the context of the video from the plurality of context representations determined from the plurality of items making up the context of the video.

Context encoder module 246 can determine a context feature vector from the plurality of context representations in any suitable way. In one example, context encoder module 246 selects one of the plurality of context representations as a context feature vector for the video. Context encoder module 246 can select one of the plurality of context representations in any suitable way, such as by computing a score based on the elements of the context representations (e.g., features), and one of the context representations based on it having a highest score. The score may be determined in any suitable way, such as by summing the elements of the context representations, a mean of the elements of the context representations, a variance of the elements of the context representations, etc. In one example, context encoder module 246 selects one of the context representations based on a timestamp of the context representation. For instance, context encoder module 246 may determine that a timestamp of the video corresponds to information that may be useful to answer a question, and selects the context representation corresponding to context of the video (e.g., an audio sentence) at or nearest to the timestamp.

Additionally or alternatively, context encoder module 246 may combine two or more of the context representations into a context feature vector, such as by concatenating two or more of the plurality of context representations into a context feature vector. Context encoder module 246 may determine two or more of the context representations to combine in any suitable way, such as based on a difference between features of context representations. For instance, context encoder module 246 may compare the context representations and determine groups of context representations, each group including context representations that are similar Similarity may be determined based on the features of the context representations. Context encoder module 246 may select a respective representative context representation from each group and combine the representative context representations into a context feature vector to represent the context of the video during a time segment of a user question. Accordingly, context encoder module 246 may generate a context feature vector that efficiently represents the context of the video and omits redundant information.

Additionally or alternatively, context encoder module 246 may generate a context feature vector to represent the context of the video during a time segment of a user question by processing the plurality of context representations jointly to learn temporal dynamics of the context. In one example, context encoder module 246 jointly processes the context representations from the sentence encoders with a neural network, such as a recurrent neural network as described in "Learning phrase representations using rim encoder-decoder for statistical machine translation" in the *Proceedings of the 2014 Conference on Empirical Methods in Natural Language Processing*, pp. 1724-1734, by K. Cho et al. For instance, each of the context representations from the sentence encoders may be supplied to a bidirectional recurrent network of layers made up of gated recurrent units (GRUs) that learn temporal dynamics of the context by sharing data among the GRUs. The context encoder module 246 may generate a context representation from the output of the bidirectional recurrent network at the time index corresponding to the question.

A context representation generated by context encoder module 246, along with any suitable information, such as a context feature vector, audio sentences of a video, a transcription of the audio sentences, context representations generated by sentence encoders, weights of a neural network used to learn temporal dynamics of the context, a time segment of a video over which context is determined (e.g., a time segment that includes a timepoint of a video at which a question related to a video is asked), text related to a user workspace of an image editing application, objects identified in an image, text extracted from an image, combinations thereof, and the like, used by or calculated by context encoder module 246 are stored in context data 230 of storage 224 and made available to modules of video application 240. In one example, context encoder module 246 provides a context representation to fusion module 248.

Fusion module 248 can be implemented to generate a classification vector based on a question representation generated by question encoder module 244 and a context representation generated by context encoder module 246. Fusion module 248 can generate a classification vector from the question representation and context representation in any suitable way. In one example, fusion module 248 fuses a question representation generated by question encoder module 244 with a context representation generated by context encoder module 246, such as by concatenating the question feature vector and the context feature vector to generate a classification vector, interleaving elements of the question feature vector with elements of the context feature vector to generate the classification vector, and the like. For instance, fusion module 248 may generate a classification vector according to $v_q \oplus v_c$, where $\oplus$ denotes concatenation and $v_q$ is a question feature vector that may include elements of a question representation generated by question encoder module 244 and $v_c$ is a content feature vector that may include elements of the context representation generated by context encoder module 246.

A classification vector generated by fusion module 248, along with any suitable information, such as a vector containing the elements of the question representation, a vector containing the elements of the context representation, statistics of the classification vector (e.g., length, mean, median, mode, maximum, and minimum values of the elements of the classification vector, etc.), combinations thereof, and the like, used by or calculated by fusion module 248 are stored in storage 224 and made available to modules of video application 240. In one example, fusion module 248 provides a classification vector to answer module 250, e.g., answer matching module 254.

Answer module 250 can be implemented to determine an answer to a question (e.g., a user question) asked during video playback. Answer module 250 includes answer encoder module 252 and answer matching module 254, which may be configured in any suitable way to determine an answer to a question asked during video playback. For instance, answer module 250 may be configured as part of a classification system and/or a matching system. As part of a classification system, answer matching module 254 may determine an answer to a question based on a classification vector provided by fusion module 248 without the use of the answer encoder module 252. As part of a matching system, however, answer matching module 254 may use the answer encoder module 252 to determine an answer to a question by matching a classification vector to an answer vector generated by the answer encoder module 252.

Answer encoder module 252 can be implemented to generate answer vectors from answer candidates in an answer pool using an answer encoder that is configured to incorporate external domain knowledge, as described next. The answer pool can include answers for a plurality of questions, not just a current question received by a user. In one example, the answer pool includes answers to questions gathered for a plurality of videos on a domain or subject, not just a single video on that subject. For instance, the answer pool may include answers for questions asked about a tutorial video included with the license of an image editing application (e.g., a tutorial video on a DVD for the image editing application), and an instructional video available online and made by a user of the image editing application. Hence, for a given domain or subject, such as videos about using Adobe Photoshop®, the answer pool is not tied to a specific video regarding that domain or subject, but instead includes answers appropriate to any video on the domain or subject, even if one of those videos was not used to generate answers that are included in the answer pool as answer candidates.

The answer pool used by answer encoder module 252 to generate answer vectors can include answers generated by knowledgeable users (e.g., professional artists), rather than crowdsourcing from the general public. For instance, pairs of questions and answers may be generated by the knowledgeable users at any suitable time during a video, and the answers may be included in the answer pool used by answer encoder module 252. The answers of the answer pool generated by the knowledgeable users can be linked to entities of domain knowledge base 256 maintained by video system 204, so that the knowledgeable users' knowledge is incorporated into the domain knowledge base. For instance, for Adobe's Photoshop® image editing application, the video system 204 may maintain an example of domain knowledge base 256 that includes data in Table 1.

TABLE 1

Domain Knowledge Base for Adobe's Photoshop ®

| Entity Type | No. of Entities | No. of Entity Options |
|---|---|---|
| Menu | 821 | — |
| Shortcut | 119 | — |
| Dialog | 95 | 694 |
| Tool | 72 | 736 |
| Key | 54 | — |
| Panel | 53 | 53 |
| Item | 15 | — |
| Action | 7 | — |

The example of domain knowledge base 256 represented by Table 1 includes entities for Photoshop® that represent objects related to Photoshop®, such as instructional resources that can be displayed in Photoshop® or a tutorial video on Photoshop® (e.g., menus, shortcuts, dialogs, etc.), software actions, user-interface components, and the like. As an example, Table 1 indicates that Photoshop® has 95 different dialog boxes that can be displayed, with 694 options for the dialog boxes, such as text options that may be displayed in the dialog boxes.

To incorporate the domain knowledge of the knowledgeable users who may generate answers in the answer pool used by answer encoder module 252, the answers in the answer pool are linked to entities or options for the entities in the domain knowledge base 256. For instance, when an answer to a question about a shortcut for a software action is generated by a knowledgeable users, the answer can be linked to the shortcut indicated in the domain knowledge base 256, such as by appending an identification number of the shortcut in the domain knowledge base 256 to the answer in the answer pool. Furthermore, related pairs of entities may be linked in the domain knowledge base 256, such as by linking the shortcut and a software action related to the shortcut. For instance, pairs of entities may be linked based on relation types including "is a", "belongs to", is the shortcut of", "is opened by", and the like. Hence, an answer may be linked directly to one or more first entities or options in the domain knowledge base 256, and be further linked to one or more additional entities or options that are linked to the first entities or options. By incorporating the external domain knowledge of knowledgeable users into the domain knowledge base 256, the domain knowledge base can be used to improve the answers to questions asked during a video compared to video systems that rely merely on the question itself to determine an answer.

In one example, answer encoder module 252 exploits the external domain knowledge in the domain knowledge base 256 by generating answer vectors from the answer candidates in the answer pool based on a graph structure of the domain knowledge base 256 that represents the linkage of answers, entities, and options of the domain knowledge base 256. For instance, answer encoder module 252 may include an answer encoder that generates a respective answer vector for each of the answer candidates in the answer pool. Answer encoder module 252 can include any suitable answer encoder, such as a neural network (e.g., a convolutional neural network) that receives a representation of an answer candidate (e.g., a concatenation of the words in an answer candidate), and generates an answer vector for the answer candidate, such as a vector representing features of the answer candidate. Answer encoder module 252 may obtain a graph structure of the domain knowledge base (e.g., a graph structure that represents the links of answer candidates of the answer pool and entities or options of the domain knowledge base 256), and configure the answer encoder based on the graph structure. In one example, answer encoder module 252 configures an answer encoder based on a graph structure by adjusting weights (e.g., convolution weights) of the answer encoder with vectors determined from embedding on the graph structure, as described in "Deepwalk: online learning of social representations" in the *Proceedings of the 20th ACM SIGKDD International Conference on Knowledge Discovery and Data Mining*, pp. 701-710, by B. Perozzi et al. For instance, the answer encoder may be initialized based on vectors determined from embedding on the graph structure, and trained together with other modules of the video system 204 using triplets including a question and answer pair generated by a knowledgeable user (e.g., professional artist), and context of the video (e.g., audio sentences).

Additionally or alternatively, answer encoder module 252 may configure an answer encoder without using a graph structure of the domain knowledge base 256. For instance, answer encoder module 252 may configure an answer encoder with a random initialization (e.g., randomly-selected convolution weights), and train the answer encoder based on the triplets of questions, answers, and context. In one example, an answer encoder of answer encoder module 252 includes a sentence encoder, such as a same or similar sentence encoder as described above and used in the question encoder module 244. For instance, the answer encoder may apply a sentence encoder to any suitable description of an answer candidate in an answer pool, such as a concatenation of the words in an answer candidate, a title of an answer candidate (e.g., an answer candidate may include a keyboard shortcut "alt-control-delete", and a title in the answer pool for the answer candidate may include the text "shortcut for restart action", so that the sentence encoder may be applied to the text of the title), combinations thereof, and the like.

An answer vector generated by answer encoder module 252, along with any suitable information, such as an answer pool that includes answer candidates, a representation of an answer encoder (e.g., weights and architecture description) used to generate answer vectors, an initialization of an answer encoder, a graph structure of a domain knowledge base, combinations thereof, and the like, used by or calculated by answer encoder module 252 are stored in answer data 234 of storage 224 and made available to modules of video application 240. In one example, answer encoder module 252 provides answer vectors to answer matching module 254.

Answer matching module 254 can be implemented to determine an answer to a question based on a classification vector generated by fusion module 248. In one example, the video system 204 is configured as a classification system in which answer matching module 254 may generate an answer directly from the classification vector, without the use of the answer vectors provided by the answer encoder module 252. Additionally or alternatively, the video system 204 can be configured as a matching system in which the answer matching module 254 determines an answer to a question by matching the classification vector provided by the answer encoder module 252 to answer vectors generated by the answer encoder module 252.

To configure the video system 204 as a classification system, answer matching module 254 may include any suitable system that can generate an answer to the question by processing the classification vector without the use of the answer vectors from the answer encoder module 252. In one example, answer matching module 254 includes a neural network with fully-connected layers and a softmax operation at the final layer. The classification vector can be provided to the neural network which processes it with the fully-connected layers, and determines an answer from the output of the softmax operation at the final layer. The neural network may be trained using triplets including a question and answer pair generated by a knowledgeable user, and context of the video (e.g., audio sentences). Hence, the answer matching module 254 generates an answer to the question based on a multi-class classification over all answer candidates used to train the neural network.

Additionally or alternatively, to configure the video system 204 as a matching system, the answer matching module 254 may include any suitable circuitry to match the classification vector provided by the answer encoder module 252 to the answer vectors generated by the answer encoder module 252. For instance, answer matching module 254 may determine matching scores between the classification vector and the answer vectors. Matching scores may include dot products between the classification vector and the answer vectors, and answer candidates may be ranked according to the dot products. Answer matching module 254 may determine an answer to a question by selecting an answer candidate whose corresponding answer vector has a highest dot product with the classification vector. Accordingly, the video system 204 when configured as a matching system can determine an answer to a question received during video playback by solving a ranking problem, $$y = \underset{a \in A}{\operatorname{argmax}} f(q, c, a)$$

where a denotes an answer candidate in the answer pool A, q denotes a question, and c denotes context of the video (e.g., audio sentences of the video in a time segment that includes a time at which the question is asked). The operator f generates a matching score for the triplet (q, c, a).

In one example, answer matching module 254 applies a matching threshold to the matching scores by comparing each of the matching scores for the answer candidates (e.g., dot products between the classification vector and answer vectors generated by answer encoder module 252 from the answer candidates) to the matching threshold. The answer matching module 254 may require that a matching score be greater than or equal to the matching threshold to determine the answer candidate having the matching score as an answer to a question. Hence, the matching threshold may represent a minimum matching score that an answer candidate must have for it to be selected as an answer to a question.

The video system 204 may provide an answer determined by answer matching module 254 to a user who asked a question. For instance, an answer determined by answer matching module 254 may be presented to a user in any suitable way, such as via a user interface as text, audio, video, combinations thereof, and the like. Additionally or alternatively, the video system 204 may play a portion of a video in response to the answer matching module 254 determining an answer to a question. For instance, the video system may determine a portion of the video related to the question (e.g., a portion of the video in which a presenter is discussing a topic relevant to the question). As part of providing the answer to the user, the video system 204 may play or replay this portion of the video to the user.

An answer determined by answer matching module 254, along with any suitable information, such as an indicator of whether the video system is configured as a matching system or a classification system, a representation of a neural network used to generate an answer from a classification vector (e.g., weights and architecture descriptions), matching scores (e.g., dot products), matching thresholds, a ranking of answer candidates based on matching scores, combinations thereof, and the like, used by or calculated by answer matching module 254 are stored in answer data 234 of storage 224 and made available to modules of video application 240. In one example, answer matching module 254 provides an answer to a question asked during video playback to a user, such as by displaying the answer in a user interface (e.g., exposing text that includes the answer), or broadcasting an audio response to the user that includes the answer to the question.

Example Video System

Figure 3:
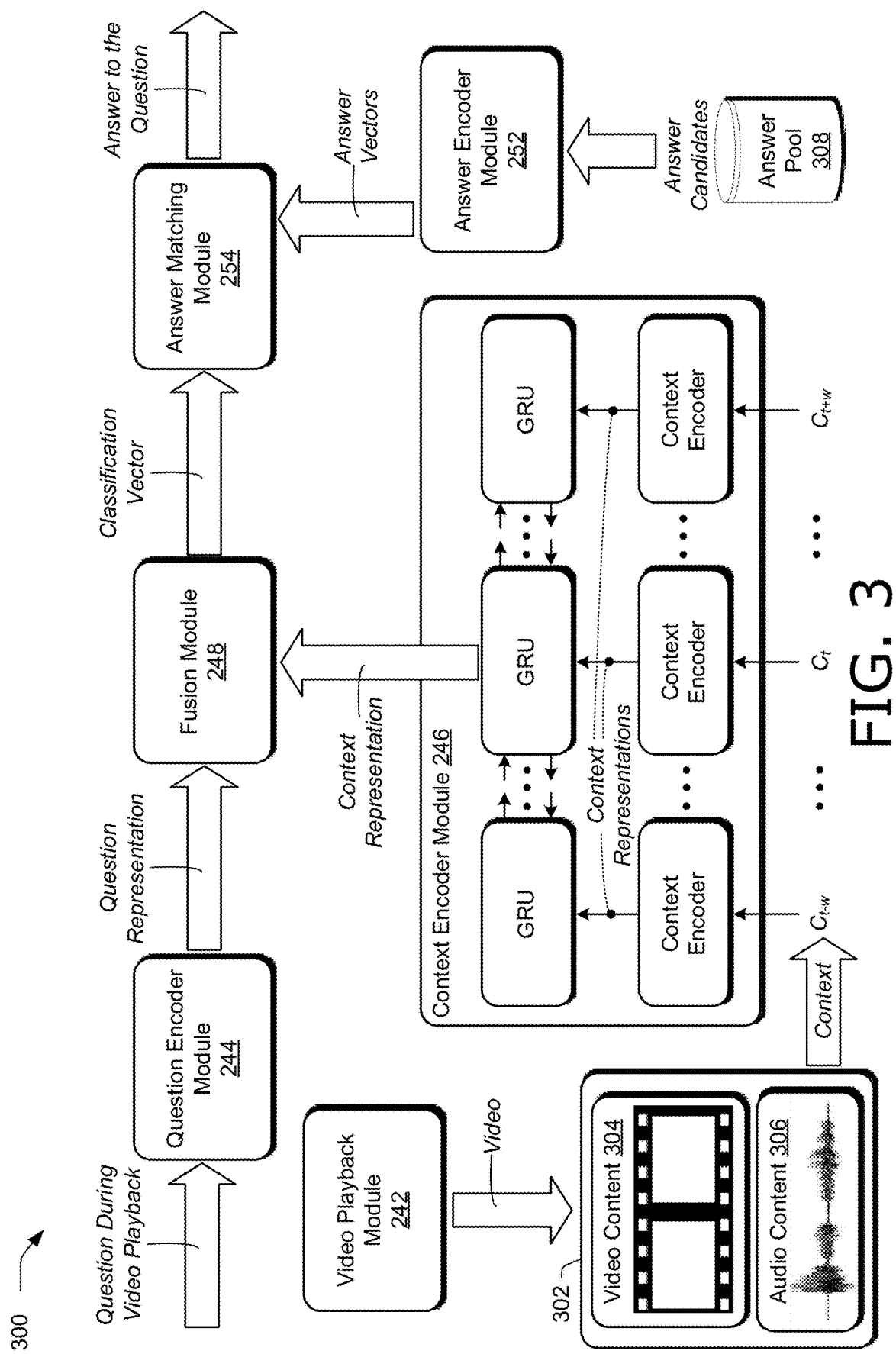
FIG. 3 illustrates an example system usable for answering questions during video playback in accordance with one or more aspects of the disclosure.

FIG. 3 illustrates an example system 300 usable for answering questions during video playback in accordance with one or more aspects of the disclosure. In this implementation, system 300 includes the modules of video application 240 as described in FIG. 2, e.g., video playback module 242, question encoder module 244, context encoder module 246, fusion module 248, answer encoder module 252, and answer matching module 254. System 300 is one example of video system 204 that can be constructed using the modules of video application 240. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity, system 300 is limited to the modules of video application 240 and a description of some of their interconnects. System 300 can, however, include any suitable signals and communications between modules omitted for simplicity. Such signals may include system clocks, counters, image frame indicators, sequence indicators, reset signals, and the like. In one example, system 300 can operate in real time (e.g., with no perceptible delay to a user). Accordingly, signals can be calculated by the modules of system 300 and communicated between the modules of system 300 without significant delay, so that a user may ask a question during video playback and receive an answer to the question from system 300 without perceptible delay to a user.

Moreover, system 300 can be implemented on any suitable device or devices. In one example, system 300 is implemented on one computing device (e.g., computing device 202 in FIG. 2). In another example, system 300 is implemented on more than one computing device. For instance, parts of system 300 can be implemented by a first computing device, such as one computing device of computing device 202 in FIG. 2, and other parts of system 300 can be implemented by an additional computing device of computing device 202. In one example, a server implements parts of system 300, such as server 214 in FIG. 2. A server can be remote, e.g., because it is not collocated with the first computing device. A server may be configured to receive signals of system 300 from a computing device (e.g., computing device 202), process the received signals, such as with video support system 216, and transmit results of the processing back to the computing device. Hence, video support system 216 of server 214 in FIG. 2 may include system 300.

Additionally or alternatively, parts of system 300 can be implemented by an additional computing device that is collocated with a first computing device. For instance, one device of computing device 202 may be a first computing device, and another device of computing device 202 may be an additional, collocated computing device. The first computing device and the additional computing device may be operated by one or more users. Hence, system 300 may provide for multiple users within an environment to share data included in system 300.

Video playback module 242 plays video 302, such as by playing back video 302 via a user interface on a client computing device. Video 302 can be any suitable type of video, such as an instructional video, tutorial video, entertainment video, video created by a professional artist, video created by an amateur designer, a video made up of image frames of a user workspace of an image editing application, combinations thereof, and the like. The video 302 includes video content 304 and audio content 306.

During playback of the video 302 at a timepoint t of the video 302, question encoder module 244 receives a user question related to the video 302. The question can be received in any suitable way, such as including text typed on a keyboard, an audio signal captured with a microphone in response to user speech, etc. Question encoder module 244 may determine text of the user question and provide the text as input to a question encoder of question encoder module 244 (e.g., a sentence encoder). For instance, question encoder module 244 may concatenate the words of the question into a string of words, and provide this string as input to a question encoder that generates a question representation from the question. Question encoder module 244 can generate any suitable type of question representation, such as a feature vector. Question encoder module 244 provides a question representation to fusion module 248.

Based on receiving the user question at timepoint t during playback of the video 302, context encoder module 246 determines context of the video for a time segment that includes the time t. Context encoder module 246 can determine context of the video in any suitable way. In one example, context encoder module 246 determines a time segment that includes the time t from a window w, e.g., the time segment represented by the range [t−w, t+w], and determines context of the video 302 within this time segment. The time window w may be set to any suitable value, such as five seconds.

Context encoder module 246 may determine any suitable context of the video 302 within the time segment [t−w, t+w], such as audio sentences from the audio content 306 of the video 302. Context encoder module 246 can determine the audio sentences in any suitable way, such as by transcribing audio content 306 to text, accessing a caption of the audio content (e.g. closed caption metadata of the video 302), and the like. Context encoder module 246 may format each of the audio sentences. For instances, for each audio sentence, context encoder module 246 may concatenate the words of the sentence into a respective content string, and provide these content strings to respective context encoders of context encoder module 246. In FIG. 3, context encoder module 246 determines audio sentences representing context of the video, and these audio sentences are included in one or more of the context strings $C_{t-w}$, $C_t$, and $C_{t+w}$. For example, the context string $C_{t-w}$ may represent an audio sentence at timepoint t−w, and the context string $C_t$ may represent an audio sentence at timepoint t, the time at which the user question is received by question encoder module 244 during playback of the video 302.

Additionally or alternatively, the context encoder module 246 may determine context of the video 302 that may not be included in the audio content 306. For instance, context encoder module 246 may determine one or more objects in video frames of the video content 304 that are displayed during the time segment [t−w, t+w]. The context encoder module 246 may represent text describing an object, such as an object name, class, properties of the object, etc., by one or more the context strings $C_{t-w}$, $C_t$, or $C_{t+w}$. As an example, one of the context strings may include the concatenation of the words "automobile", "Chevrolet", "Corvette", and "1963" to denote that an image frame of the video 302 depicts a 1963 Corvette.

In one example, context encoder module 246 determines text in one or more video frames of the video content 304 that are displayed during the time segment [t−w, t+w], such as text of a sign (e.g., a street sign or billboard) as part of the video content 304. Hence one or more of the context strings $C_{t-w}$, $C_t$, or $C_{t+w}$ may include a concatenation of words from one or more signs. For instance, one of the context strings may include the concatenation of the words "Haight" and "Ashbury" for an image depicting street signs on the corner of Haight Street and Ashbury Street in San Francisco, Calif.

Additionally or alternatively, the video 302 can image frames of a user workspace of an image editing application, and context encoder module 246 can determine context of the video 302 as text related to the image frames. For instance, the context encoder module 246 may determine editing commands performed by a user in the user workspace and data related to the editing commands, including questions and answers regarding an editing command, a help file (e.g., instructions for use) of an editing command, similar editing commands used by other users, etc., and represent this data related to the editing commands by text in one or more context strings. Accordingly, the context strings $C_{t-w}$, $C_t$, or $C_{t+w}$ may include text describing context from one or more sources, such as audio sentences of the audio content 306, text extracted from the video content 304, objects identified in the video content 304, text describing editing commands, and the like.

Context encoder module 246 provides the context strings $C_{t-w}$, $C_t$, and $C_{t+w}$ that represent context of the video 302 to respective context encoders of context encoder module 246. Each of the context encoders generates respective context representations, such as with a sentence encoder common to each of the context encoders. Context encoder module 246 uses the respective context representations from the context encoders to generate a context representation for the context of the video (e.g., a context feature vector) within the time segment that include the timepoint t at which the user question is asked. Context encoder module 246 can generate a context representation for the context of the video based on the respective context representations from the context encoders in any suitable way, such as by jointly processing the context representations from the context encoders. For instance, in the example in FIG. 3, system 300 provides the context representations from the context encoders to a bidirectional recurrent network of layers made up of GRUs in the context encoder module 246. The GRUs learn temporal dynamics of the context by sharing data among the GRUs. The context encoder module 246 generates a context representation for the context of the video from the output of the bidirectional recurrent network at the timepoint t corresponding to the question. If an output of the bidirectional recurrent network is not available for the timepoint t corresponding to the question, the context encoder module 246 may generate a context representation for the context of the video from an output of the bidirectional recurrent network at a time that is closest to the timepoint t. The context encoder module 246 provides a context representation (e.g., a context feature vector) for the context of the video corresponding to a time segment that includes the timepoint t at which the user question is asked to fusion module 248.

Fusion module 248 receives a question representation from the question encoder module 244 and a context representation from the context encoder module 246, and fuses the question representation and the context representation to generate a classification vector. For instance, fusion module 248 may concatenate a question feature vector of the question representation and a context feature vector of the context representation to generate the classification vector. Fusion module 248 provides the classification vector to answer matching module 254.

Answer encoder module 252 generates answer vectors for answer candidates in an answer pool 308 for the domain of the video 302. For instance, if the video 302 is an instructional video on Adobe Photoshop®, the answer pool 308 may include answer candidates obtained for a plurality of videos on Adobe Photoshop® and not just the video 302. Hence, answer encoder module 252 can generate answer vectors for answer candidates in the answer pool 308 in which the answers may be obtained for a plurality of videos regarding Adobe Photoshop®, rather than just the video 302. Further, the answer candidates in the answer pool 308 may be generated by knowledgeable users (e.g., professional artists) trained in the use of Adobe Photoshop®, instead of amateur designers who may lack domain knowledge about Adobe Photoshop®.

Answer encoder module 252 can generate answer vectors from the answer candidates of the answer pool 308 in any suitable way. In one example, answer encoder module 252 includes an answer encoder that is configured based on a graph structure representing a domain knowledge base in which answer candidates of the answer pool 308 are linked to entities of the domain knowledge base, as described above with regards to Table 1. In another example, an answer encoder of answer encoder module 252 is not based on the graph structure representing the domain knowledge base, but instead is trained from a random initialization using triplets of questions, answers, and context (e.g., audio sentences). The questions and answers may be determined by knowledgeable users. In still another example, an answer encoder of answer encoder module 252 is configured as a sentence encoder that is a same sentence encoder used by the question encoder module 244 and the context encoders of the context encoder module 246. Answer encoder module 252 provides answer vectors to answer matching module 254.

Answer matching module 254 receives the classification vector from fusion module 248 and answer vectors from the answer encoder module 252, and determines an answer to the question asked during the video playback. The configuration of answer matching module 254 can determine the configuration of system 300 as a classification system or a matching system. As a classification system, answer matching module 254 can determine an answer to the question based on the classification vector without the answer vectors from the answer encoder module 252. As a matching system, however, answer matching module 254 can determine an answer to the question based on the classification vector and the answer vectors. Hence, when system 300 is configured as a classification system, answer encoder module 252 may be disabled to save resources (e.g., device power and processing resources), and the answer matching module 254 may not receive answer vectors from the answer encoder module 252.

Video System 300 Configured as a Classification System

As a classification system, system 300 generates an answer to the question based on a multi-class classification over answer candidates. The answer matching module 254 may include a neural network with fully-connected layers and a softmax operation at the final layer. The classification vector is provided to the neural network, which determines an answer from the output of the softmax operation at the final layer. The neural network may be trained using triplets including a question and answer pair generated by a knowledgeable user, and context of the video (e.g., audio sentences). Hence, the answer matching module 254 incorporates the knowledge of the knowledgeable users regarding question and answer pairs into the weights of the trained neural network, so that answer matching module 254 does not require the answer vectors from the answer encoder module 252. Rather, the answer matching module 254 determines an answer to the question directly from the classification vector.

Video System 300 Configured as a Matching System

As a matching system, system 300 generates an answer to the question based on solving a ranking problem of the answer candidates in the answer pool. Hence, in this configuration, answer matching module 254 receives answer vectors from the answer encoder module 252 in addition to the classification vector from the fusion module 248. Answer matching module 254 matches the classification vector from the fusion module 248 to the answer vectors from the answer encoder module 252 by computing respective matching scores between the classification vector and the answer vectors. In one example, answer matching module 254 computes matching scores based on inner products (e.g., dot products) between the classification vector and the answer vectors.

Answer matching module 254 determines an answer to the question asked during the video playback based on the matching scores between the classification vector and the answer vectors. For instance, answer matching module 254 may select an answer candidate as an answer to the question based on the answer vector for the answer candidate having a largest matching score among the answer candidates in the answer pool 308. In one example, answer matching module 254 requires that the matching score for the answer be greater than a matching threshold. Answer matching module 254 may provide an answer to the question to the user who asked the question, such as by displaying the answer in a user interface, broadcasting an audio response that includes the answer, showing a video that illustrates the answer, combinations thereof, and the like.

Experimental Results of Video System 300

Table 2 compares the performance of system 300 in various example configurations, including as a classification system and a matching system, as described above. Table 2 also includes different configurations of answer encoder module 252, including a first configuration (entitled 'title text' in Table 2) in which answer encoder module 252 is configured as a same sentence encoder that is used by the question encoder module 244 and the context encoders of the context encoder module 246, and is provided a title of an answer candidate as text input, a second configuration (entitled 'random init' in Table 2) in which the answer encoder module 252 includes an answer encoder trained from a random initialization using triplets of questions, answers, and context (e.g., audio sentences), and a third configuration (entitled 'graph' in Table 2) in which the answer encoder module 252 includes an answer encoder that is based on a graph structure representing a domain knowledge base that links answer candidates of the answer pool 308 to entities of the domain knowledge base, also as described above.

To compare performance of the different configurations of system 300, Table 2 includes multiple performance measures, including a mean reciprocal rank (MRR), recall@k, and average rank of the ground truth answer. The MMR can be computed from an average of the multiplicative inverses of the ranks of the answers. Recall@k denotes a probability an answer is in the top-k ranked answers. Accordingly, a higher value of MMR and recall@k performance measures indicates better performance, and a lower value of the average rank performance measure indicates better performance (e.g., a rank of one may be best).

TABLE 2

Example Performance of System 300

| System Configuration | Answer Encoder Configuration | MRR | Recall@1 | Recall@5 | Recall@10 | Average Rank |
|---|---|---|---|---|---|---|
| Classification | — | .5206 | .4169 | .6329 | .7072 | 40.67 |
| Matching | title text | .5184 | .4131 | .6338 | .7143 | 24.12 |
| Matching | random init | .5610 | .4494 | .6890 | .7527 | 61.16 |
| Matching | graph | .5832 | .4806 | .6992 | .7764 | 18.75 |

The example performance of system 300 in Table 2 is for comparative purposes among the different system configurations, and is not meant as a prediction of absolute performance levels. In some embodiments, as can be seen from Table 2 (emphasized in bold), system 300 when configured as a matching system and having an answer encoder that is configured based on the graph structure outperforms the other configurations of system 300. In this configuration, the answer encoder of answer encoder module 252 is based on a graph structure that represents a domain knowledge base that includes external domain knowledge of knowledgeable users (e.g., professional artists). The graph structure represents links between answer candidates of the answer pool 308 and entities of the domain knowledge base. By basing the weights of the answer encoder on this graph structure, the domain knowledge is imparted to the answer encoder module 252 and transferred to the answer vectors generated by the answer encoder. Hence, compared to other configurations, the performance in determining answers to questions during video playback is improved.

Furthermore, though not shown in Table 2, performance of each of the configurations of Table 2 were also compared to the case when the context of the video is omitted. For instance, the fusion module 248 in FIG. 3 does not receive the context representation from context encoder module 246 when the context of the video is omitted. In this case, the classification vector is determined solely from the question representation generated by question encoder module 244, rather than by fusing the context representation and the question representation. In all cases, the performance listed in Table 2 outperformed the performance of the corresponding case in which the context of the video is omitted. Hence, by determining answers to questions during playback of a video based on context of the video, system 300 outperforms conventional systems in which an answer to a question asked during a video is based merely on the question itself, without considering context of the video.

The systems described herein constitute an improvement over conventional systems that do not determine an answer to a question during video playback based on context of the video, but instead determine the answer based merely on the question itself. The systems described herein determine context of a video within a time segment of the video that includes the time at which the question is asked. For example, the systems described herein may use audio sentences from the video within the time segment, and can determine an answer to the question based on the context of the video in the time segment. Moreover, the systems described herein may maintain a domain knowledge base that incorporates external domain knowledge of trained, knowledgeable users. Based on a graph structure of the domain knowledge base that represents links between entities of the domain knowledge base and answer candidates generated by the knowledgeable users, the systems described herein can generate answer vectors in which the domain knowledge is transferred. By matching a classification vector generated from the question and the context of the video to the answer vectors, the systems described herein can determine an answer to the question by solving a ranking problem of the answer candidates, with ranks influenced by the external domain knowledge of the domain knowledge base.

Furthermore, because the answer pool of answer candidates may not be specific to any one video, but rather generally represents videos of a domain, the systems described herein are not limited to use on a video for which questions and answers have been collected. Instead, the systems described herein can be used for any suitable video pertaining to the domain, even if the answer pool does not contain any answers that were generated in response to questions asked during the video.

Example Procedures

FIG. 4 illustrates an example procedure 400 for answering questions during video playback in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of a video system, such as system 300 or video system 204. A video system implementing procedure 400 may be an independent application that has been installed on the computing device, a service hosted by a service provider that is accessible by the computing device, a plug-in module to the computing device, or combinations thereof.

At a timepoint of a video during playback of the video, a question related to the video is received (block 402). For instance, question encoder module 244 receive, at a timepoint of the video during the playback of the video, a question related to the video. In one example, the video is a tutorial video. For instance, the tutorial video can provide use instructions for an image editing application installed on a computing device, such as computing device 202 in FIG. 2. Additionally or alternatively, the video can include image frames of a user workspace on an image editing application installed on the computing device.

A segment of the video that includes the timepoint of the video is determined (block 402). For instance, context encoder module 246 may determine a segment of the video that includes the timepoint of the video. The segment may correspond to a time window that is centered about the timepoint of the video, and the width of the time window may be user-selectable, such as via a user interface displayed on the computing device. As an example, the width of the window may be set to be less than ten seconds.

Audio sentences of the video that occur within the segment of the video are determined (block 406). For instance, context encoder module 246 may determine audio sentences of the video that occur within the segment of the video. The context encoder module 246 may convert the audio sentences from speech to text.

A classification vector is generated from words of the question and words of the audio sentences of the video (block 408). For instance, the context encoder module 246 may determine a context representation from the audio sentences, such as a context feature vector generated from one or more sentence encoders that are each provided words of a respective audio sentence as text. The question encoder module 244 may determine a question representation from the question, such as a question feature vector generated from a sentence encoder that is provided words of the question as text. Fusion module 248 may fuse the question representation and the context representation to generate the classification vector, such as by concatenating the question feature vector and the context feature vector to generate the classification vector.

An answer to the question is determined utilizing the classification vector (block 410). For instance, answer module 250 may determine an answer to the question utilizing the classification vector. In one example, a classification system determines an answer to the question by providing the classification vector to a neural network having fully-connected layers and a softmax operation at a final layer. The answer can be determined as an output of the softmax operation.

Additionally or alternatively, a matching system may determine an answer to the question by obtaining answer candidates that are linked to entities in a domain knowledge base. The answer candidates can include answers for additional questions that are different from the question. The entities may represent instructional resources that can be displayed in the video. At least one of the answer candidates can also be linked to an option for one of the entities in the domain knowledge base. The matching system may generate answer vectors based on the answer candidates, and determine the answer to the question by selecting one of the answer candidates based on the classification vector. For instance, answer module 250 may generate dot products between the classification vector and the answer vectors, and select one of the answer candidates based on the dot products, such as an answer candidate corresponding to a largest dot product. In one example, answer module 250 determines a graph structure of the domain knowledge base, and configures an answer encoder based on the graph structure. The answer module 250 can generate the answer vectors with the answer encoder configured based on the graph structure.

Figure 5:
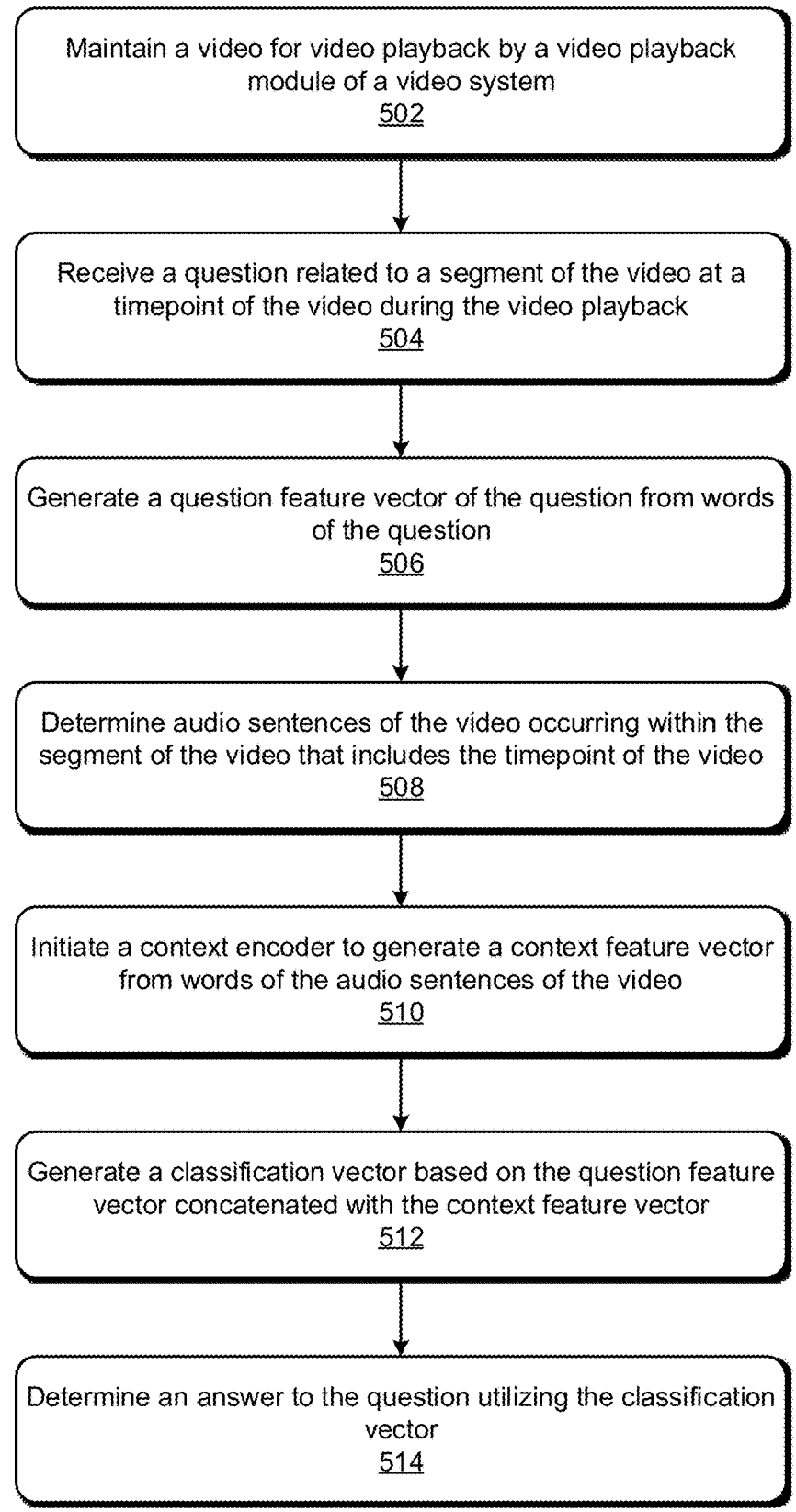
FIG. 5 illustrates a flow diagram depicting an example procedure in accordance with one or more aspects of the disclosure.

FIG. 5 illustrates an example procedure 500 for answering questions during video playback in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of a video system, such as system 300 or video system 204. A video system implementing procedure 500 may be an independent application that has been installed on the computing device, a service hosted by a service provider that is accessible by the computing device, a plug-in module to the computing device, or combinations thereof.

A video is maintained for video playback by a video playback module of a video system (block 502). For instance, video playback module 242 may be configured to maintain a video for the video playback. The video can be any suitable type of video, such as an instructional video for a software application. In one example, the video includes a workspace of an image editing application.

A question related to a segment of the video is received at a timepoint of the video during the video playback (block 504). For instance, question encoder module 244 may receive a question related to a segment of the video at a timepoint of the video during the video playback. A question feature vector of the question is generated from words of the question (block 506). For instance, question encoder module 244 may generate a question feature vector of the question from words of the question.

Audio sentences of the video occurring within the segment of the video that includes the timepoint of the video are determined (block 508). For instance, context encoder module 246 may determine audio sentences of the video occurring within the segment of the video that includes the timepoint of the video. Context encoder module 246 may obtain an audio recording of the audio sentences and transcribe the audio sentences to text, so that the audio sentences include text of an audio track of the video. Additionally or alternatively, context encoder module 246 may obtain the audio sentences as text, such as from metadata of the video that includes a transcription of the audio for closed captions.

A context encoder is initiated to generate a context feature vector from words of the audio sentences of the video (block 510). For instance, context encoder module 246 may initiate a context encoder to generate a context feature vector from words of the audio sentences of the video. Context encoder module 246 may generate a context feature vector by generating respective context representations for each of the audio sentences and jointly processing the respective context representations to generate a context feature vector that represents the audio sentences, such as by processing the respective context representations with a bidirectional recurrent layer to learn temporal dynamics of the audio sentences.

A classification vector is generated based on the question feature vector concatenated with the context feature vector (block 512). For instance, fusion module 248 may generate a classification vector based on the question representation and the context representation, such as by concatenating content of the question representation with content of the context representation to generate the classification vector.

An answer to the question is determined utilizing the classification vector (block 514). For instance, answer module 250 may determine an answer to the question utilizing the classification vector. The answer module 250 may be configured to generate answer vectors based on answer candidates that are linked to entities in a domain knowledge base. The entities can represent instructional resources that can be displayed in the video. Answer module 250 may select one of the answer candidates as the answer to the question based on the classification vector, such as by generating dot products between the classification vector and the answer vectors, and selecting one of the answer candidates as the answer based on the dot products. In one example, the answer module 250 is configured to obtain a graph structure of the domain knowledge base and generate the answer vectors based on the graph structure.

Additionally or alternatively, at least one of the question encoder module, the context encoder module, or the answer module can be configured to receive weights that are determined by training on triplets that include a candidate question, at least one audio sentence of the video, and one of the answer candidates. The candidate question and answer candidate can be generated by trained, knowledgeable users, rather than crowdsourcing from the general public.

FIG. 6 illustrates an example procedure 600 for answering questions during video playback in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of a video system, such as system 300 or video system 204. A video system implementing procedure 600 may be an independent application that has been installed on the computing device, a service hosted by a service provider that is accessible by the computing device, a plug-in module to the computing device, or combinations thereof.

Audio sentences of a video are determined (block 602). The audio sentences can occur within a time segment during the playback of the video that includes a timepoint of the video at which a question is received. For instance, question encoder module 244 may receive a user question during playback of the video, and context encoder module 246 may determine context of the video based on the question, including audio sentences that occur within a time segment during playback of the video that includes a timepoint of the video at which the question is received.

A classification vector is generated based on concatenating a question feature vector determined from words of the question and a context feature vector determined from words of the audio sentences of the video (block 604). For instance, fusion module 248 may fuse a question representation of the question generated by question encoder module 244 and a context representation determined from the audio sentences by the context encoder module 246, such as by concatenating a question feature vector determined from words of the question and a context feature vector determined from words of the audio sentences of the video to generate the classification vector.

An answer to the question is determined based on matching the classification vector to one of a plurality of answer vectors (block 606). For instance, answer encoder module may determine an answer to the question based on matching the classification vector to one of a plurality of answer vectors. Matching can include generating respective scores between the classification vector and the plurality of answer vectors, and selecting one of the answer vectors that has a highest one of the respective scores.

In one example, answer candidates are obtained that are linked to entities in a domain knowledge base. The answer candidates may be drawn from an answer pool that is not dedicated to the question, but rather includes answers to other questions. The entities may represent instructional resources that can be displayed in the video. A graph structure of the domain knowledge base can be determined, and the answer vectors can be generated from the answer candidates based on the graph structure.

The procedures described herein constitute an improvement over conventional procedures that do not determine an answer to a question during video playback based on context of the video, but instead determine the answer based merely on the question itself. The procedures described herein determine context of a video within a time segment of the video that includes the time at which the question is asked. For example, the procedures described herein may use audio sentences from the video within the time segment, and can determine an answer to the question based on the context of the video in the time segment. Moreover, the procedures described herein may maintain a domain knowledge base that incorporates external domain knowledge of trained, knowledgeable users. Based on a graph structure of the domain knowledge base that represents links between entities of the domain knowledge base and answer candidates generated by the knowledgeable users, the procedures described herein can generate answer vectors in which the domain knowledge is transferred. By matching a classification vector generated from the question and the context of the video to the answer vectors, the procedures described herein can determine an answer to the question by solving a ranking problem of the answer candidates, with ranks influenced by the external domain knowledge of the domain knowledge base.

Furthermore, because the answer pool of answer candidates may not be specific to any one video, but rather generally represents videos of a domain, the procedures described herein are not limited to use on a video for which questions and answers have been collected. Instead, the procedures described herein can be used for any suitable video pertaining to the domain, even if the answer pool does not contain any answers that were generated in response to questions asked during the video.

Example Systems and Devices

Figure 7:
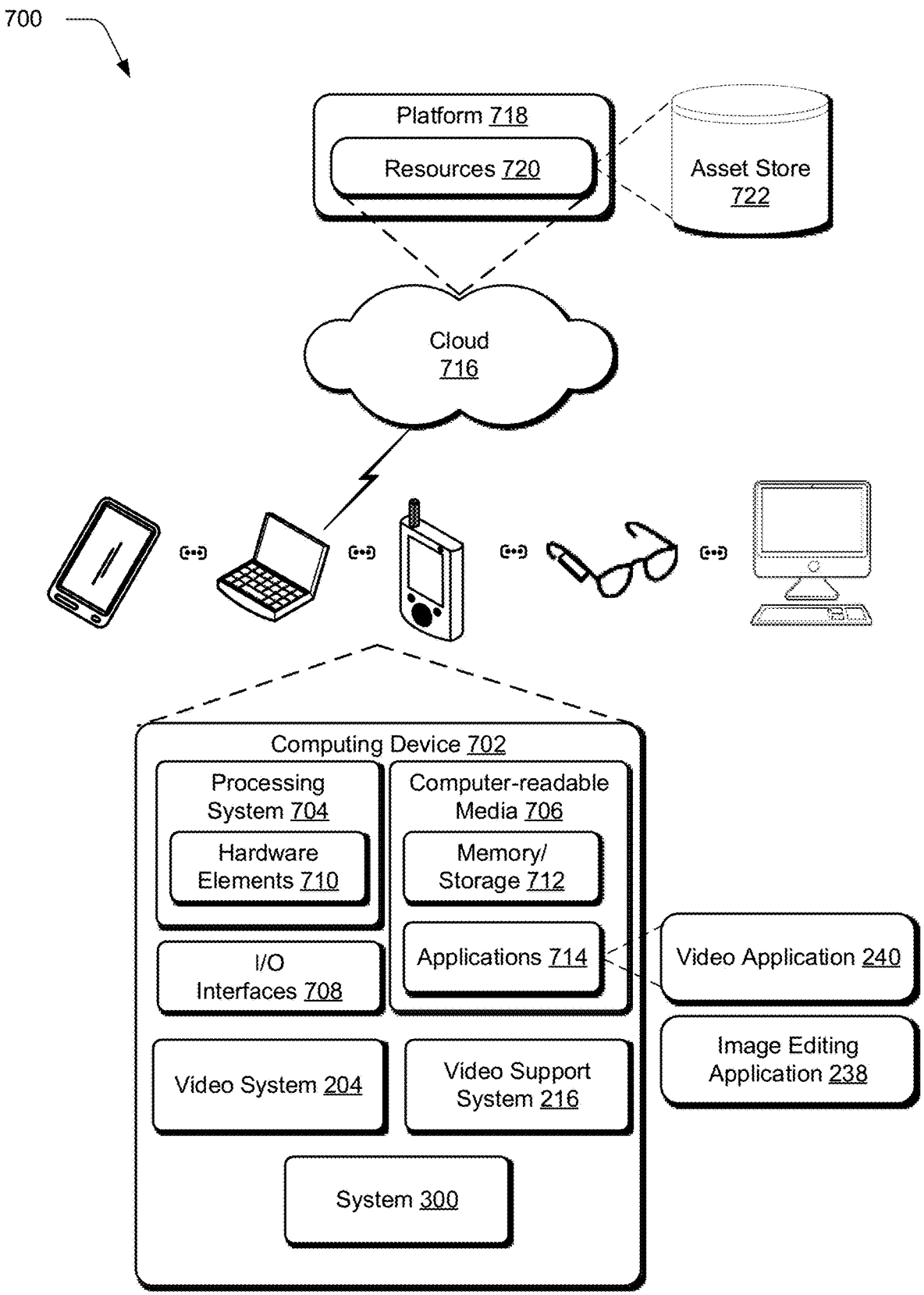
FIG. 7 illustrates an example system including various components of an example device that can be implemented as any type of computing device as described and/or utilized with reference to FIGS. 1-6 to implement aspects of the techniques described herein.

FIG. 7 illustrates an example system 700 including an example computing device 702 that is representative of one or more computing systems and devices that can be utilized to implement the various techniques described herein. This is illustrated through inclusion of video system 204, system 300, video application 240, and video support system 216, which operate as described above. Computing device 702 may be, for example, a user computing device (e.g., computing device 202), or a server device of a service provider, (e.g., server 214). Furthermore, computing device 702 may include an on-chip system, multiple computing devices, combinations thereof, or any other suitable computing device or computing system. Accordingly, FIG. 7 illustrates computing device 702 as one or more of a tablet, a laptop computer, a smart phone, smart eye glasses, and a desktop computer, though these examples are illustrative and in no way are meant to limit the type or number of devices that may be represented by computing device 702.

The example computing device 702 includes a processing system 704, one or more computer-readable media 706, and one or more I/O interfaces 708 that are communicatively coupled to each other. Although not shown, computing device 702 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 704 is representative of functionality to perform one or more operations using hardware. Accordingly, processing system 704 is illustrated as including hardware elements 710 that may be configured as processors, functional blocks, and so forth. This may include implementation in hardware as an application specific integrated circuit or other logic device formed using one or more semiconductors. Hardware elements 710 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 222 in FIG. 2 are an example of processing system 704.

Computer-readable storage media 706 is illustrated as including memory/storage 712. Storage 224 in FIG. 2 is an example of memory/storage of memory/storage 712. Memory/storage 712 may include volatile media (such as random access memory (RAM)), nonvolatile media (such as read only memory (ROM), flash memory, optical disks, magnetic disks, and so forth), or combinations thereof. Memory/storage 712 may include fixed media (e.g., RAM, ROM, a fixed hard drive, and so on) as well as removable media (e.g., flash memory, a removable hard drive, an optical disc, and so forth). Computer-readable media 706 may be configured in a variety of other ways as further described below.

Input/output interfaces 708 are representative of functionality to allow a user to enter commands and information to computing device 702, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, input/output interfaces 708 may include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 702 may be configured in a variety of ways as further described below to support user interaction.

Computing device 702 also includes applications 714. Applications 714 are representative of any suitable applications capable of running on computing device 702, and may include a web browser which is operable to access various kinds of web-based resources (e.g., videos, assets, media clips, images, content, configuration files, services, user profiles, and the like). Applications 714 include video application 240 and image editing application 238, as previously described. Furthermore, applications 714 may include any applications supporting video system 204, system 300, and video support system 216.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 702. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 710, or combinations thereof. Computing device 702 may be configured to implement particular instructions and functions corresponding to the software and hardware modules. Accordingly, implementation of a module that is executable by computing device 702 as software may be achieved at least partially in hardware, e.g., through use of computer-readable storage media and hardware elements 710 of processing system 704. The instructions and functions may be executable/operable by one or more articles of manufacture (for example, one or more computing devices such as computing device 702 or processing systems such as processing system 704) to implement techniques, modules, and examples described herein.

The techniques described herein may be supported by various configurations of computing device 702 and are not limited to the specific examples of the techniques described herein. This functionality may also be implemented all or in part through use of a distributed system, such as over a "cloud" 716 via a platform 718. Cloud 716 includes and is representative of a platform 718 for resources 720. Platform 718 abstracts underlying functionality of hardware (e.g., servers) and software resources of cloud 716. Resources 720 may include applications, data, or applications and data that can be utilized while computer processing is executed on servers that are remote from computing device 702. Resources 720 can also include services provided over the Internet, through a subscriber network, such as a cellular or Wi-Fi network, or combinations thereof. Resources 720 can include asset store 722, which stores assets, such as videos (e.g., tutorial videos and instructional videos), images, photographs (e.g., user images in a gallery, a database of stock photographs, and the like), document templates, user profile data, user image libraries, photographs posted in a shared photo service, animation sequences, digital images, metadata of assets, and the like, and may be accessed by computing device 702.

Generally, resources 720 may be licensed, purchased, or may be made freely available, (e.g., without authentication, license, or account-based access). The resources 720 can include any suitable combination of services and content, such as a video-editing service, an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets as described above, including instructional videos.

Platform 718 may abstract resources and functions to connect computing device 702 with other computing devices. Platform 718 may also serve to abstract scaling of resources to provide a corresponding level of scale to encountered demand for resources 720 that are implemented via platform 718. Accordingly, in an interconnected device embodiment, implementation of functionality described herein may be distributed throughout system 700. For example, the functionality may be implemented in part on computing device 702 as well as via platform 718 that abstracts the functionality of cloud 716.

Conclusion

In one or more implementations, a digital medium environment includes at least one computing device. Systems, devices, and techniques are described herein for answering questions during video playback. A video system determines context of a video during a time at which a question is asked, such as by determining audio sentences of the video within a time segment that includes a time the question is asked. The video system can generate a question representation from the question and a context representation from the audio sentences of the video, and fuse the two representations into a classification vector that can be used to determine the answer by solving a ranking problem. The video system may match the classification vector to answer vectors by computing dot products between the classification vector and the answer vectors, and select an answer to the question based on the dot products. The video system can generate the answer vectors with an answer encoder that encodes answer candidates drawn from an answer pool that includes answers for a plurality of questions, not just a current question received by a user. Moreover, the answers can be generated by knowledgeable users, such as professional artists trained in the use of image editing applications) whose knowledge is incorporated into a domain knowledge base by linking the answers to entities of the domain knowledge base. The video system can configure the answer encoder that encodes the answer candidates based on a graph structure of the domain knowledge base, thus transferring the domain knowledge to the answer vectors. Accordingly, the video system can generate an answer to a question based on context of the video when the question is asked, and the answer is grounded to the domain knowledge base. Hence, the video system is not limited to answering questions having an answer that may be determined from the question itself, but can also answer questions having an answer that requires context of the video or domain knowledge about the video.

Although implementations of answering questions during video playback have been described in language specific to features and/or methods, the appended claims are not necessarily limited to the specific features or methods described. Rather, the specific features and methods are disclosed as example implementations of answering questions during video playback, and other equivalent features and methods are intended to be within the scope of the appended claims. Further, various different examples are described and it is to be appreciated that each described example can be implemented independently or in connection with one or more other described examples.

What is claimed is:

1. In a digital medium environment for answering questions during playback of a video, a method implemented by a computing device, the method comprising:
  receiving, at a timepoint of the video during the playback of the video, a question related to the video, the question having a context absent from discussion in the video;
  determining a segment of the video that includes the timepoint of the video;
  determining audio sentences of the video that occur within the segment of the video;
  generating a classification vector from words of the question and words of the audio sentences of the video; and
  determining an answer to the question utilizing the classification vector.

2. The method as described in claim 1, wherein the generating the classification vector comprises:
generating a question representation of the question as a question feature vector determined from the words of the question;
generating a context representation of the audio sentences as a context feature vector determined from the words of the audio sentences of the video; and
concatenating the question feature vector and the context feature vector to generate the classification vector.

3. The method as described in claim 1, wherein the determining the answer to the question comprises:
providing the classification vector to a neural network having fully-connected layers and a softmax operation at a final layer; and
determining the answer to the question as an output of the softmax operation of the neural network.

4. The method as described in claim 1, wherein the determining the answer to the question comprises:
obtaining answer candidates that are linked to entities in a domain knowledge base, the entities representing instructional resources that are displayable in the video; and
selecting one of the answer candidates as the answer to the question utilizing the classification vector.

5. The method as described in claim 4, further comprising:
generating answer vectors based on the answer candidates;
generating dot products between the classification vector and the answer vectors; and
the selecting the one answer candidate is based on the dot products.

6. The method as described in claim 5, wherein the generating the answer vectors comprises:
determining a graph structure that represents the domain knowledge base; and
configuring an answer encoder based on the graph structure, wherein the answer vectors are generated with the answer encoder.

7. The method as described in claim 4, wherein at least one of the answer candidates is further linked to a user-selectable option for one of the instructional resources represented by one of the entities in the domain knowledge base.

8. The method as described in claim 4, wherein the answer candidates include answers for additional questions that are different from the question.

9. The method as described in claim 1, wherein the video is a tutorial video.

10. The method as described in claim 9, wherein the tutorial video provides use instructions for an image editing application installed on the computing device.

11. The method as described in claim 1, wherein the video includes image frames of a user workspace on an image editing application installed on the computing device.

12. A video system implemented by a computing device to answer a question during video playback in a digital medium environment, the video system comprising:
a memory to maintain a video for the video playback by a video playback module of the video system; and
a processor system configured to execute a video application implemented to:
receive a question related to a segment of the video at a timepoint of the video during the video playback, the question having a context absent from discussion in the video;
generate a question feature vector of the question from words of the question;
determine audio sentences of the video occurring within the segment of the video that includes the timepoint of the video;
initiate a context encoder to generate a context feature vector from words of the audio sentences of the video;
generate a classification vector based on the question feature vector concatenated with the context feature vector; and
determine an answer to the question utilizing the classification vector.

13. The video system as described in claim 12, wherein the video application is implemented to:
generate answer vectors based on answer candidates that are linked to entities in a domain knowledge base, the entities representing instructional resources that are displayable in the video; and
select one of the answer candidates as the answer to the question utilizing the classification vector.

14. The video system as described in claim 13, wherein the video application is implemented to generate dot products between the classification vector and the answer vectors, and select the one of the answer candidates as the answer to the question based on the dot products.

15. The video system as described in claim 13, wherein the video application is implemented to obtain a graph structure that represents the domain knowledge base and generate the answer vectors utilizing the graph structure.

16. The video system as described in claim 13, wherein the video application is implemented to receive weights that are determined by training on triplets that include a candidate question, at least one audio sentence of the video, and one of the answer candidates.

17. In a digital medium environment for answering questions during playback of a video, a computer-readable storage memory storing instructions that when executed on a processor of a computing device cause the computing device to perform operations comprising:
determining audio sentences of the video, the audio sentences occurring within a time segment during the playback of the video that includes a timepoint of the video at which a question is received;
generating a classification vector based on concatenating a question feature vector determined from words of the question and a context feature vector determined from words of the audio sentences of the video; and
determining an answer to the question based on matching the classification vector to one of a plurality of answer vectors.

18. The computer-readable storage memory as described in claim 17, wherein the matching comprises:
generating respective scores between the classification vector and the plurality of answer vectors; and
selecting one of the answer vectors that has a highest one of the respective scores.

19. The computer-readable storage memory as described in claim 17, wherein the determining the answer to the question comprises:
obtaining answer candidates that are linked to entities in a domain knowledge base, the entities representing instructional resources that are displayable in the video;
determining a graph structure that represents the domain knowledge base; and
generating the answer vectors from the answer candidates utilizing the graph structure.

20. The computer-readable storage memory as described in claim 19, wherein the answer candidates are obtained from an answer pool that is not dedicated to the question.

* * * * *